United States Patent
Morris et al.

(10) Patent No.: US 12,320,294 B2
(45) Date of Patent: Jun. 3, 2025

(54) SINGLE-TRANSPORT MOBILE ELECTRIC POWER GENERATION

(71) Applicant: Typhon Technology Solutions (U.S.), LLC, The Woodlands, TX (US)

(72) Inventors: Jeffrey G. Morris, The Woodlands, TX (US); Matthew Crawford, The Woodlands, TX (US); Brett Vann, The Woodlands, TX (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 77 days.

(21) Appl. No.: 17/987,658

(22) Filed: Nov. 15, 2022

(65) Prior Publication Data

US 2023/0071116 A1 Mar. 9, 2023

Related U.S. Application Data

(63) Continuation of application No. 17/066,226, filed on Oct. 8, 2020, now Pat. No. 11,512,632, which is a
(Continued)

(51) Int. Cl.
*F02C 6/00* (2006.01)
*F02C 7/04* (2006.01)
(Continued)

(52) U.S. Cl.
CPC ............ *F02C 6/00* (2013.01); *F02C 7/04* (2013.01); *H02K 5/20* (2013.01); *H02K 7/1823* (2013.01);
(Continued)

(58) Field of Classification Search
CPC .... F02C 6/00; F02C 7/04; H02K 5/20; H02K 7/1823; H02K 9/18; H02K 9/26; H02K 2205/09; F05D 2220/32; F05D 2220/76
(Continued)

(56) References Cited

U.S. PATENT DOCUMENTS 3,791,682 A 2/1974 Mitchell
5,095,221 A 3/1992 Tyler
(Continued)

FOREIGN PATENT DOCUMENTS

AR 087298 A1 3/2014
AR 092923 A1 5/2015
(Continued)

OTHER PUBLICATIONS

European Patent Office, European Patent Application No. 20956897. 1, Oct. 10, 2023, 10 pages.
(Continued)

*Primary Examiner* — Charles Reid, Jr.
(74) *Attorney, Agent, or Firm* — Fenwick & West LLP

(57) ABSTRACT

A power generation transport includes a gas turbine, an inlet plenum coupled to an intake of the gas turbine, a generator driven by the gas turbine, and an air intake and exhaust module including an air inlet filter housing, an intake air duct coupled to the housing at a first end and to the inlet plenum at a second end, and an exhaust collector coupled to an exhaust of the gas turbine. The transport further includes at least one base frame. The frame mounts and aligns the gas turbine, the inlet plenum, the generator, and the air intake and exhaust module. The intake air duct is mounted on the base frame so as to be disposed underneath the gas turbine, and extend along the base frame from an exhaust end side of the gas turbine to an intake end side, in a longitudinal direction of the power generation transport.

15 Claims, 8 Drawing Sheets

Related U.S. Application Data continuation-in-part of application No. 16/861,063, filed on Apr. 28, 2020, now Pat. No. 11,434,763.

(60) Provisional application No. 62/841,558, filed on May 1, 2019.

(51) Int. Cl.
  *H02K 5/20* (2006.01)
  *H02K 7/18* (2006.01)
  *H02K 9/18* (2006.01)
  *H02K 9/26* (2006.01)

(52) U.S. Cl.
  CPC ............... *H02K 9/18* (2013.01); *H02K 9/26* (2013.01); *F05D 2220/32* (2013.01); *F05D 2220/76* (2013.01); *H02K 2205/09* (2013.01)

(58) Field of Classification Search
  USPC ........................................................ 290/52
  See application file for complete search history.

(56) References Cited

U.S. PATENT DOCUMENTS

| | | |
|---|---|---|
| 5,517,822 A | 5/1996 | Haws et al. |
| 6,007,227 A | 12/1999 | Carlson |
| 6,334,746 B1 | 1/2002 | Nguyen et al. |
| 6,765,304 B2 | 7/2004 | Baten et al. |
| 6,786,051 B2 | 9/2004 | Kristich et al. |
| 7,114,322 B2 | 10/2006 | Yamanaka et al. |
| 7,581,379 B2 | 9/2009 | Yoshida et al. |
| 7,608,935 B2 | 10/2009 | Scherzer |
| 7,683,499 B2 | 3/2010 | Saucier |
| 7,819,209 B1 | 10/2010 | Bezner |
| 8,587,136 B2 | 11/2013 | Williams |
| 8,745,991 B2 | 6/2014 | Kim et al. |
| 8,872,366 B2 | 10/2014 | Campion et al. |
| 9,068,506 B2 | 6/2015 | Eleftheriou et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,366,114 B2 | 6/2016 | Coli et al. |
| 9,475,020 B2 | 10/2016 | Coli et al. |
| 9,475,021 B2 | 10/2016 | Coli et al. |
| 9,534,473 B2 | 1/2017 | Morris et al. |
| 10,030,579 B2 | 7/2018 | Austin et al. |
| 10,107,084 B2 | 10/2018 | Coli et al. |
| 10,107,085 B2 | 10/2018 | Coli et al. |
| 10,221,668 B2 | 3/2019 | Coli et al. |
| 10,227,855 B2 | 3/2019 | Coli et al. |
| 10,502,042 B2 | 12/2019 | Coli et al. |
| 10,544,753 B2 | 1/2020 | Filippone |
| 10,648,312 B2 | 5/2020 | Coli et al. |
| 10,689,961 B2 | 6/2020 | Coli et al. |
| 10,718,194 B2 | 7/2020 | Coli et al. |
| 10,724,353 B2 | 7/2020 | Coli et al. |
| 10,774,630 B2 | 9/2020 | Coli et al. |
| 10,837,270 B2 | 11/2020 | Coli et al. |
| 10,851,634 B2 | 12/2020 | Coli et al. |
| 10,876,386 B2 | 12/2020 | Coli et al. |
| 10,895,138 B2 | 1/2021 | Coli et al. |
| 2003/0057704 A1 | 3/2003 | Baten et al. |
| 2003/0079479 A1 | 5/2003 | Kristich et al. |
| 2004/0188360 A1 | 9/2004 | Armstrong et al. |
| 2006/0080971 A1 | 4/2006 | Smith et al. |
| 2006/0225402 A1 | 10/2006 | Kierspe et al. |
| 2006/0254281 A1 | 11/2006 | Badeer et al. |
| 2008/0048456 A1 | 2/2008 | Browning et al. |
| 2008/0266758 A1 | 10/2008 | Hurt |
| 2009/0015021 A1 | 1/2009 | Towada |
| 2014/0096974 A1 | 4/2014 | Coli et al. |
| 2014/0138079 A1 | 5/2014 | Broussard et al. |
| 2014/0157778 A1 | 6/2014 | Ponnuraj et al. |
| 2014/0174717 A1 | 6/2014 | Broussard et al. |
| 2015/0033698 A1 | 2/2015 | Cuevas et al. |
| 2015/0068724 A1 | 3/2015 | Coli et al. |
| 2015/0300145 A1 | 10/2015 | Coli et al. |
| 2015/0300291 A1 | 10/2015 | Yamanaka et al. |
| 2015/0314255 A1 | 11/2015 | Coli et al. |
| 2016/0177675 A1* | 6/2016 | Morris .................... E21B 43/26 166/308.1 |
| 2016/0177678 A1* | 6/2016 | Morris ................. E21B 41/0085 60/772 |
| 2016/0208593 A1 | 7/2016 | Coli et al. |
| 2016/0208594 A1 | 7/2016 | Coli et al. |
| 2016/0248230 A1 | 8/2016 | Tawy et al. |
| 2016/0326855 A1 | 11/2016 | Coli et al. |
| 2016/0369609 A1 | 12/2016 | Morris et al. |
| 2017/0036178 A1 | 2/2017 | Coli et al. |
| 2017/0037718 A1 | 2/2017 | Coli et al. |
| 2017/0104389 A1 | 4/2017 | Morris et al. |
| 2017/0129338 A1 | 5/2017 | Cryer et al. |
| 2017/0259227 A1 | 9/2017 | Morris et al. |
| 2018/0080377 A1 | 3/2018 | Austin et al. |
| 2018/0202356 A1 | 7/2018 | Godman |
| 2018/0363434 A1 | 12/2018 | Coli et al. |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0055827 A1 | 2/2019 | Coli et al. |
| 2019/0063341 A1* | 2/2019 | Davis ...................... F02D 29/06 |
| 2019/0112908 A1 | 4/2019 | Coli et al. |
| 2019/0169971 A1 | 6/2019 | Oehring et al. |
| 2019/0204021 A1 | 7/2019 | Morris et al. |
| 2019/0211661 A1 | 7/2019 | Reckels et al. |
| 2019/0271218 A1 | 9/2019 | Coli et al. |
| 2019/0277125 A1 | 9/2019 | Coli et al. |
| 2019/0277126 A1 | 9/2019 | Coli et al. |
| 2019/0277127 A1 | 9/2019 | Coli et al. |
| 2019/0277128 A1 | 9/2019 | Coli et al. |
| 2020/0040762 A1 | 2/2020 | Boyce et al. |
| 2020/0088202 A1 | 3/2020 | Sigmar et al. |
| 2020/0318467 A1 | 10/2020 | Coli et al. |
| 2020/0347710 A1 | 11/2020 | Coli et al. |
| 2020/0347711 A1 | 11/2020 | Coli et al. |
| 2020/0347725 A1 | 11/2020 | Morris et al. |

FOREIGN PATENT DOCUMENTS

| | | |
|---|---|---|
| AR | 104823 A2 | 8/2017 |
| AR | 104824 A2 | 8/2017 |
| AR | 104825 A2 | 8/2017 |
| AR | 104826 A2 | 8/2017 |
| CA | 2678638 A1 | 11/2008 |
| CA | 2955706 A1 | 10/2012 |
| CA | 2639418 C | 4/2014 |
| CA | 2773843 C | 1/2016 |
| CA | 2835904 C | 2/2017 |
| CA | 2845347 C | 6/2017 |
| CA | 2900387 C | 9/2018 |
| CN | 104995376 A | 10/2015 |
| CN | 105736143 A | 7/2016 |
| CN | 110848028 A | 2/2020 |
| EP | 2904200 A1 | 8/2015 |
| EP | 2726705 B1 | 8/2018 |
| EP | 3444430 A1 | 2/2019 |
| EP | 3444431 A1 | 2/2019 |
| EP | 3444432 A1 | 2/2019 |
| EP | 3447239 A1 | 2/2019 |
| EP | 3453827 A2 | 3/2019 |
| EP | 3456915 A1 | 3/2019 |
| MX | 358054 B | 8/2018 |
| MX | 362628 B | 1/2019 |
| MX | 365888 B | 6/2019 |
| MX | 365889 B | 6/2019 |
| MX | 366049 B | 6/2019 |
| WO | WO 2014/053056 A1 | 4/2014 |
| WO | WO 2016/100524 A1 | 6/2016 |

(56) References Cited

FOREIGN PATENT DOCUMENTS

WO     WO 2018/044307 A1     3/2018
WO     WO 2019/045687 A1     3/2019

OTHER PUBLICATIONS

China National Intellectual Property Administration, First Office Action, Chinese Patent Application No. 202080032162.7, Jan. 28, 2023, 21 pages.
European Patent Office, Extended European Search Report, European Patent Application No. 20799122.5, Nov. 11, 2022, 12 pages.
EPO Extended Search Report issued on Oct. 15, 2018, in the prosecution of European Application No. 15870991.5, 13 pages.
Powerpoint Presentation, "TM2500 & TM2500+ Mobile Gas Turbine Generator", from www.scawa.com/files/SCA_TM2500.pdf., Oct. 9, 2014, 24 pages.
PCT International Search Report and Written Opinion, PCT Application No. PCT/US2020/055592, Jan. 21, 2021, 15 pages.
PCT International Search Report and Written Opinion, PCT Application No. PCT/US2020/030306, Jul. 28, 2020, 14 pages.
United States Office Action, U.S. Appl. No. 17/066,226, filed Mar. 2, 2022, 19 pages.

\* cited by examiner

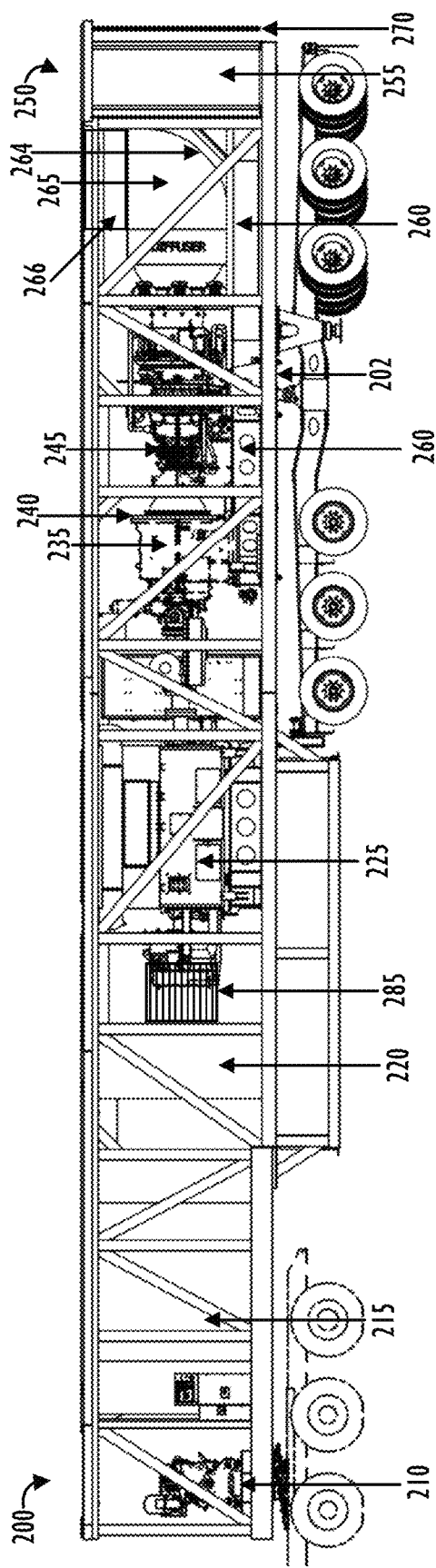
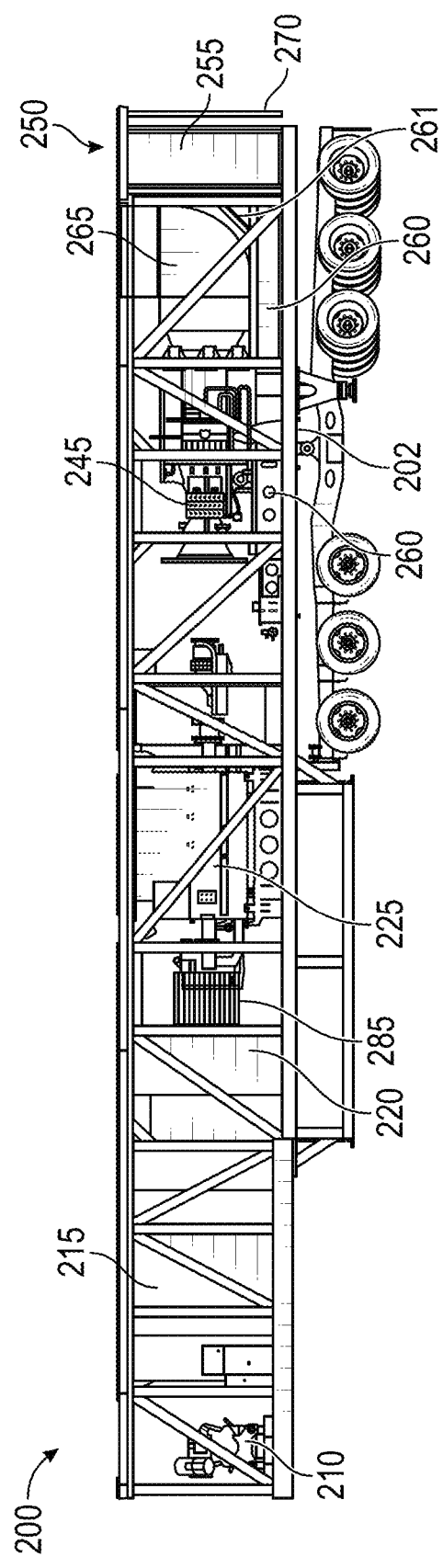
FIG. 2A
FIG. 2B

SINGLE-TRANSPORT MOBILE ELECTRIC POWER GENERATION

CROSS-REFERENCE TO RELATED APPLICATION

This application is a continuation of U.S. patent application Ser. No. 17/066,226, filed Oct. 8, 2020 by Jeffrey G. Morris et al. and entitled "Single-Transport Mobile Electric Power Generation," which is a continuation-in part of U.S. patent application Ser. No. 16/861,063 (Now U.S. Pat. No. 11,434,763), filed Apr. 28, 2020 by Jeffrey G. Morris et al. and entitled "Single-Transport Mobile Electric Power Generation," which claims the benefit of U.S. Provisional Patent Application No. 62/841,558, filed May 1, 2019 by Jeffrey G. Morris et al. and entitled "Single-Transport Mobile Electric Power Generation," both of which are hereby incorporated by reference as if reproduced in their entirety.

TECHNICAL FIELD

Embodiments of the invention generally relate to mobile electric power generation, and more particularly to gas turbine based mobile electric power generation using a single trailer configuration that minimizes on-site footprint and increases mobility.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking," is the process of injecting fracturing fluid, which is typically a mixture of water, sand, and chemicals, into the subsurface to fracture the subsurface geological formations and release otherwise encapsulated hydrocarbon reserves. The fracturing fluid is typically pumped into a wellbore at a relatively high pressure sufficient to cause fissures within the underground geological formations. Specifically, once inside the wellbore, the pressurized fracturing fluid is pressure pumped down and then out into the subsurface geological formation to fracture the underground formation. A fluid mixture that may include water, various chemical additives, and proppants (e.g., sand or ceramic materials) can be pumped into the underground formation to fracture and promote the extraction of the hydrocarbon reserves, such as oil and/or gas. For example, the fracturing fluid may comprise a liquid petroleum gas, linear gelled water, gelled water, gelled oil, slick water, slick oil, poly emulsion, foam/emulsion, liquid carbon dioxide, nitrogen gas, and/or binary fluid and acid.

Implementing large-scale fracturing operations at well sites typically require extensive investment in equipment, labor, and fuel. For instance, a typical fracturing operation uses a variety of fracturing equipment, numerous personnel to operate and maintain the fracturing equipment, large amounts of fuel to power the fracturing operations, and large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing any environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a power generation transport includes: a gas turbine; an inlet plenum coupled to an intake of the gas turbine; a generator driven by the gas turbine; an air intake and exhaust module including: an air inlet filter housing; an intake air duct coupled to the air inlet filter housing at a first end and to the inlet plenum at a second end; and an exhaust collector coupled to an exhaust of the gas turbine; and at least one base frame, wherein the at least one base frame mounts and aligns the gas turbine, the inlet plenum, the generator, and the air intake and exhaust module of the power generation transport.

In another embodiment, an apparatus for providing mobile electric power comprises: a power generation transport including: a generator; a power source configured to drive the generator; an air inlet filter housing disposed on an exhaust end side of the power source; an inlet plenum coupled to the air inlet filter housing, and configured for providing air to the power source, wherein the inlet plenum is disposed on an intake end side of the power source; an intake air duct coupled to the air inlet filter housing at a first end thereof and to the inlet plenum at a second end; an exhaust collector configured for collecting exhaust from the power source, and disposed on the exhaust end side of the power source; wherein the air inlet filter housing, the inlet plenum, the exhaust collector, the power source, and the generator are mounted on the power generation transport.

In yet another embodiment, a method for providing mobile electric power includes: setting an air inlet filter housing door at an end surface of a power generation transport to an open position in an operational mode of the power generation transport; supplying air to a gas turbine disposed on the power generation transport via an intake air flow passage, the intake air flow passage being defined by the air inlet filter housing, an intake air duct, and an inlet plenum, wherein the air inlet filter housing is disposed on an exhaust end side of the gas turbine, the intake air duct is coupled to the air inlet filter housing at a first end and to the inlet plenum at a second end, and the inlet plenum is disposed on an intake end side of the gas turbine; generating electricity by operating a generator disposed on the power generation transport with mechanical energy generated by operation of the gas turbine; expelling exhaust air from the gas turbine via an exhaust air flow passage, the exhaust air flow passage being defined by an exhaust collector disposed on the exhaust end side of the gas turbine, the exhaust air flow passage extending from an exhaust of the gas turbine, passing through a flow passage of the exhaust collector, and ending at an exhaust air outlet disposed on a ceiling of an enclosure of the power generation transport, wherein the air inlet filter housing is disposed at the exhaust end side of the gas turbine, and wherein the intake air flow passage passes underneath the exhaust collector and the gas turbine from the exhaust end side to the intake end side.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A-2B are schematic diagrams showing side-profile views of a power generation transport, in accordance with one or more embodiments.

Figure 1:
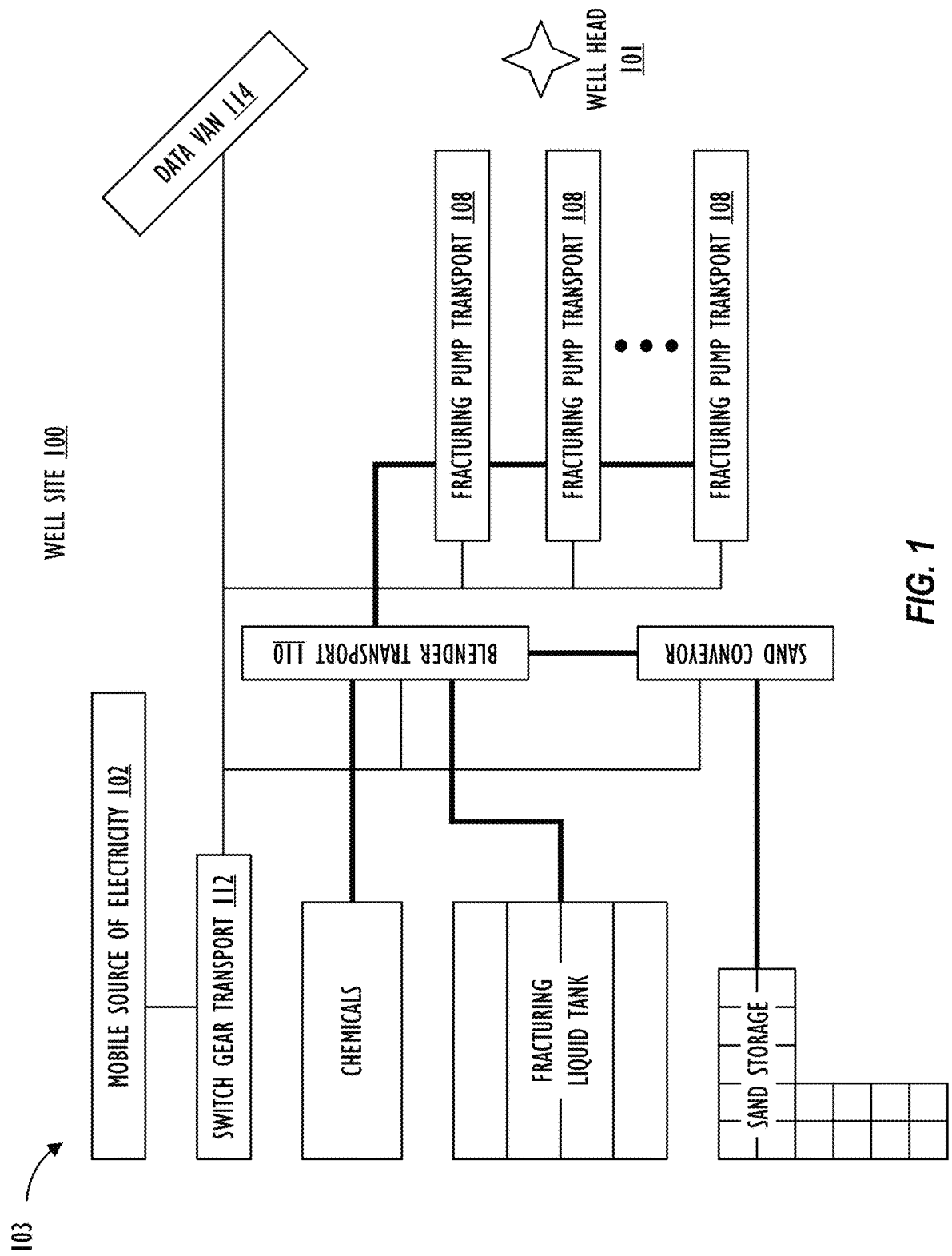
FIG. 1 is a schematic diagram of a mobile hydraulic fracturing system operating at a well site, in accordance with one or more embodiments.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure.

DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "transport" refers to any transportation assembly, including, but not limited to, a trailer, truck, skid, and/or barge used to transport relatively heavy structures, such as a mobile gas turbine generator.

As used herein, the term "trailer" refers to a transportation assembly used to transport relatively heavy structures, such as a mobile gas turbine generator that can be attached and/or detached from a transportation vehicle used to pull or move the trailer. In one embodiment, the trailer may include the mounts and manifold systems to connect the trailer to other equipment.

As used herein, the term "gas turbine generator" refers to both the gas turbine and the generator sections of a gas-turbine generator transport (e.g., power generation transport, mobile source of electricity, turbine package, and turbine trailer). The gas turbine generator receives hydrocarbon fuel, such as natural gas, and converts the hydrocarbon fuel into electricity.

As used herein, the term "inlet plenum" may be interchanged and generally referred to as "inlet", "air intake," and "intake plenum," throughout this disclosure. Additionally, the term "exhaust collector" may be interchanged throughout and generally referred to as "exhaust diffuser" and "exhaust plenum" throughout this disclosure.

As used herein, the term "gas turbine inlet filter" may be interchanged and generally referred to as "inlet filter" and "inlet filter assembly." The term "air inlet filter housing" may also be interchanged and generally referred to as "filter housing" and "air filter assembly housing" throughout this disclosure.

This disclosure pertains to a mobile source of electricity that may be configured to provide mobile electric power for different applications or use cases. The mobile source of electricity may be implemented using a single transport (e.g., single trailer or truck) to reduce its "footprint" at a work site. The transport (e.g., power generation transport, gas turbine generator transport, and the like) may comprise a gas turbine and generator along with other equipment to supply electric power for different applications requiring a mobile source of electricity (e.g., well sites, data centers, agricultural applications, and the like). For example, the power generation transport may comprise one or more of a black start generator; control cabinets including variable frequency drives (VFDs); controls room; control system; switch gear; generator; turbine starter electric motor; gearbox; air intake or inlet plenum; gas turbine; and an air intake and exhaust module that includes a plurality of components including gas turbine air inlet filter housing, filter housing door, turbine intake air duct, exhaust collector, and exhaust stack. The power generation transport may further comprise additional ancillary equipment to produce electric power like a gas conditioning unit, breaker, transformer, and the like.

The power generation transport may be configured to be 'self-sufficient' such that it can be quickly mobilized and de-mobilized without requiring use of external mechanical means or apparatus. For example, after reaching a remote site where a mobile source of electricity is required, the power generation transport can be quickly converted from a transportation mode to an operational mode by, e.g., opening the door of the air inlet filter housing and the exhaust flap, and further supplying hydrocarbon fuel to the turbine. The gas turbine of the power generation transport may then be operated to generate electricity. After the mobile source of electricity is no longer required at the remote site, the power generation transport can be quickly mobilized to be in the transportation mode without use of any external mechanical apparatus. In the operational mode, the power generation transport may produce electric power in the range of about 1-16 megawatts (MW) (e.g., 5.6 MW, 7.9 MW, etc.).

The air intake and exhaust module of the power generation transport may be modular and compact, and may be disposed on the exhaust end side of the gas turbine on the rear end of the transport. The air intake and exhaust module may be integrally formed or may comprise a plurality of components that are coupled together to provide filtered intake air for combustion by the gas turbine and vent exhaust air from the turbine to safely release heated exhaust air into the atmosphere. The plurality of components of the air intake and exhaust module may include an air inlet filter housing for filtering outside air for combustion by the gas turbine; an intake air duct (e.g., passage, vent, tube, and the like) for flowing the filtered air to the intake port (e.g., flange face opening) of the turbine; an exhaust collector and an exhaust stack for venting the exhaust air from the turbine from the roof of the enclosure. The power generation transport may be configured such that the inlet plenum of the gas turbine is fluidly coupled to the air inlet filter housing of the air intake and exhaust module via the intake air flow duct, and the exhaust end (e.g., exhaust port, exhaust diffuser, exhaust, and the like) of the gas turbine is fluidly coupled to the exhaust collector of the air intake and exhaust module. The air intake and exhaust module may be disposed on the exhaust end side of the turbine so that both an intake air flow path and an exhaust air flow path defined by the air intake and exhaust module may begin on the same (e.g., rear or exhaust end) side of the gas turbine, with the intake air flow path passing underneath the turbine and the exhaust collector from the exhaust side to the intake side of the turbine to be fed into the inlet plenum.

That is, the intake air duct of the air intake and exhaust module may be disposed between the gas turbine and a trailer bed frame of the power generation transport so as to run along the trailer bed frame from the exhaust end side of the gas turbine to the intake end side, and to allow filtered intake combustion air to flow underneath the turbine and into the inlet plenum on the intake port side. This intake air may then pass through the turbine during power generation, and be released as exhaust air into the exhaust collector via the exhaust end of the turbine. The air inlet filter housing of the air intake and exhaust module may thus be provided on a side of the gas turbine that is opposite to the air intake side thereof. The exhaust collector may be fixedly and fluidly coupled with an exhaust stack (or integrally formed therewith) on a top side thereof, and a flap or lid may cover the opening at the top of the exhaust stack so as to be flush with the roof of the enclosure of the transport.

Although the power generation transport has been described as being equipped with a single train of components (e.g., train of components including generator, gear box, inlet plenum, gas turbine, and the air intake and exhaust module) disposed at a rear end of the transport, this may not necessarily be the case. In some embodiments, the power generation transport may be equipped with two independent trains of components respectively disposed at the front and the rear ends of the transport to provide a power generation system with total redundancy of components. That is, the transport may be equipped with two generators, two gear boxes, two inlet plenums, two gas turbines, and two air intake and exhaust modules, such that the two air intake and exhaust modules are respectively disposed at the front and rear ends of the transport. A control system disposed on the power generation transport may then operate the two independent power generation trains in conjunction with a load distribution system (e.g., control system) to achieve an independent operation of the two trains, or a synchronized operation with load balancing or load sharing. In some embodiments, the exhaust collector of the air intake and exhaust module may be equipped with a heat exchanger component disposed in the air passage between the exhaust end of the gas turbine and the exhaust air outlet at the roof of the transport to recapture heat energy from the heated exhaust air and use the heat energy for different applications or use cases.

The mobile source of electricity may have different applications. For example, one or more instances of the transport may power electric hydraulic fracturing operations for one or more well sites by providing electric power to a variety of fracturing equipment located at the well sites. The different fracturing equipment, which include, but are not limited to, a blender, hydration unit, fracturing pump transport, sand handling equipment, chemical additive system, and the mobile source of electricity, may be configured to operate remotely via a control network system that monitors and controls the fracturing equipment using a communication network. In other embodiments, the power generation transport may be implemented to provide electric power for other applications (e.g., industrial, mining, commercial, civilian, agricultural, manufacturing, and the like) where mobile electric power is needed and where the requisite hydrocarbon fuel (e.g., natural gas) required to power the power generation transport is available.

FIG. 1 is a schematic diagram of an embodiment of well site 100 which comprises wellhead 101 and mobile fracturing system 103 that relies on mobile electric power generation to power a fracturing operation. Generally, mobile fracturing system 103 may perform fracturing operations to complete a well and/or transform a drilled well into a production well. For example, well site 100 may be a site where operators are in the process of drilling and completing a well. Operators may start the well completion process with drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and mobile fracturing system 103 may be moved onto well site 100 to perform fracturing operations that force relatively high pressure fracturing fluid through wellhead 101 into subsurface geological formations to create fissures and cracks within the rock. Fracturing system 103 may be moved off well site 100 once the operators complete the fracturing operations. Typically, fracturing operations for well site 100 may last several days.

To provide an environmentally cleaner and more transportable fracturing fleet, mobile fracturing system 103 may comprise mobile source of electricity 102 (e.g., one or more instances of the power generation transport shown in FIGS. 2A-8B) configured to generate electricity by burning hydrocarbon fuel, such as natural gas, obtained from one or more other sources (e.g., a producing wellhead) at well site 100, from a remote offsite location, and/or another relatively convenient location near mobile source of electricity 102. Improving mobility of mobile fracturing system 103 may be beneficial because fracturing operations at a well site typically last for several days and the fracturing equipment is subsequently removed from the well site after completing fracturing operation. Rather than using fuel that is costly and significantly impacts air quality (e.g., diesel fuel) as a source of power and/or receiving electric power from a grid or other type of stationary power generation facility (e.g., located at the well site or offsite), mobile fracturing system 103 utilizes mobile source of electricity 102 running on natural gas as a power source that may already be freely available at wellsite 100 and that burns cleaner. The generated electricity from mobile source of electricity 102 may be supplied to fracturing equipment to power fracturing operations at one or more well sites, or to other equipment in various types of applications requiring mobile electric power generation. Mobile source of electricity 102 may be implemented as a single power generation transport in order to reduce the well site footprint and provide the ability for operators to easily move mobile source of electricity 102 to different well sites and/or different fracturing jobs and/or different physical locations along with other components of system 103. Although not shown in FIG. 1, multiple instances of mobile source of electricity 102 (e.g., multiple power generation transports) may be utilized in order to generate the adequate amount of power needed for the hydraulic fracturing operations. Configuration and method of operation of mobile source of electricity 102 is described in more detail in connection with FIGS. 2A-9. Mobile source of electricity 102 is not limited for use in fracturing operations and may be applicable to power other types of equipment and for other applications (e.g., industrial, mining, commercial, civilian, agricultural, manufacturing, and the like). The use and discussion of FIG. 1 is only an example to facilitate ease of description and explanation of mobile source of electricity 102.

In addition to mobile source of electricity 102, mobile fracturing system 103 may include switch gear transport 112, at least one blender transport 110, at least one data van 114, and one or more fracturing pump transports 108 that deliver fracturing fluid through wellhead 101 to subsurface geological formations. Switch gear transport 112 may receive electricity generated from mobile source of electric power 102 via one or more electrical connections. In one embodiment, switch gear transport 112 may use 13.8 kilovolts (kV) electrical connections to receive power from mobile source of electricity 102. Switch gear transport 112 may comprise a plurality of electrical disconnect switches, fuses, transformers, and/or circuit protectors to protect the fracturing equipment. The switch gear transport 112 may transfer the electricity received from the mobile source of electricity 102 to the electrically connected fracturing equipment of mobile fracturing system 103. Switch gear transport 112 may further comprise a control system to control, monitor, and provide power to the electrically connected fracturing equipment.

In one embodiment, switch gear transport 112 may receive an electrical connection at a first voltage and perform one or more voltage step down or voltage step up operations (e.g., using one or more transformers disposed on transport 112) before providing the converted voltage to other fracturing equipment, such as fracturing pump transport 108, blender transport 110, sand storage and conveyor, hydration equipment, chemical equipment, data van 114, lighting equipment, and any additional auxiliary equipment of system 103 used for the fracturing operations. The control system may be configured to connect to a control network system such that switch gear transport 112 may be monitored and/or controlled from a distant location, such as data van 114 or some other type of control center. Alternately, switch gear transport 112 may simply pass through a voltage to downstream equipment (e.g., frac pump transport 108), and the downstream equipment may include one or more transformers to perform any voltage conversion operations (e.g., convert 13.8 kV voltage to lower voltage levels like 4.8 kV, 600 V, and the like) to power downstream frac equipment. In some embodiments, one or more components of switch gear transport 112 may be disposed on mobile source of electricity 102, and switch gear transport 112 may be omitted from system 103.

Fracturing pump transport 108 may receive the electric power from switch gear transport 112 (or from mobile source of electricity 102) to power a prime mover. The prime mover converts electric power to mechanical power for driving one or more pumps. In one embodiment, the prime mover may be a dual shaft electric motor that drives two different pumps. Fracturing pump transport 108 may be arranged such that one pump is coupled to opposite ends of the dual shaft electric motor and avoids coupling the pumps in series. By avoiding coupling the pump in series, fracturing pump transport 108 may continue to operate when either one of the pumps fails or have been removed from fracturing pump transport 108. Additionally, repairs to the pumps may be performed without disconnecting the system manifolds that connect fracturing pump transport 108 to other fracturing equipment within mobile fracturing system 103 and wellhead 101.

Blender transport 110 may receive electric power fed through switch gear transport 112 to power a plurality of electric blenders. A plurality of prime movers may drive one or more pumps that pump source fluid and blender additives (e.g., sand) into a blending tub, mix the source fluid and blender additives together to form fracturing fluid, and discharge the fracturing fluid to fracturing pump transport 108. In one embodiment, the electric blender may be a dual configuration blender that comprises electric motors for the rotating machinery that are located on a single transport, which is described in more detail in U.S. Pat. No. 9,366,114, filed Apr. 6, 2012 by Todd Coli et al. and entitled "Mobile, Modular, Electrically Powered System for use in Fracturing Underground Formations," which is herein incorporated by reference in its entirety. In another embodiment, a plurality of enclosed mixer hoppers may be used to supply the proppants and additives into a plurality of blending tubs.

Data van 114 may be part of a control network system, where data van 114 acts as a control center configured to monitor and provide operating instructions to remotely operate blender transport 110, mobile source of electricity 102, and fracturing pump transport 108 and/or other fracturing equipment within mobile fracturing system 103. For example, data van 114 may communicate via the control network system with the variable frequency drives (VFDs) located within system 103 that operate and monitor the health of the electric motors used to drive the pumps on fracturing pump transports 108. In one embodiment, data van 114 may communicate with the variety of fracturing equipment using a control network system that has a ring topology. A ring topology may reduce the amount of control cabling used for fracturing operations and increase the capacity and speed of data transfers and communication. Other fracturing equipment shown in FIG. 1, such as water tanks, chemical storage of chemical additives, hydration unit, sand conveyor, and sandbox storage are known by persons of ordinary skill in the art, and therefore are not discussed in further detail.

Although FIG. 1 describes mobile source of electricity 102 as being part of mobile fracturing system 103 for performing electric hydraulic fracturing operations at well site 100, mobile source of electricity 102 may also be used for any other application where a mobile source of electricity is required. Mobile source of electricity 102 may be configured to be transportable to different locations. Once the mobile source of electricity is no longer required at a given location, it may be easily transported to a new location where such mobile source of electricity is now required. Regardless of the application, the mobile source of electricity may include a power generation transport that is configured as a single transport that improves mobility and provides reduced onsite footprint.

Figure 3A:
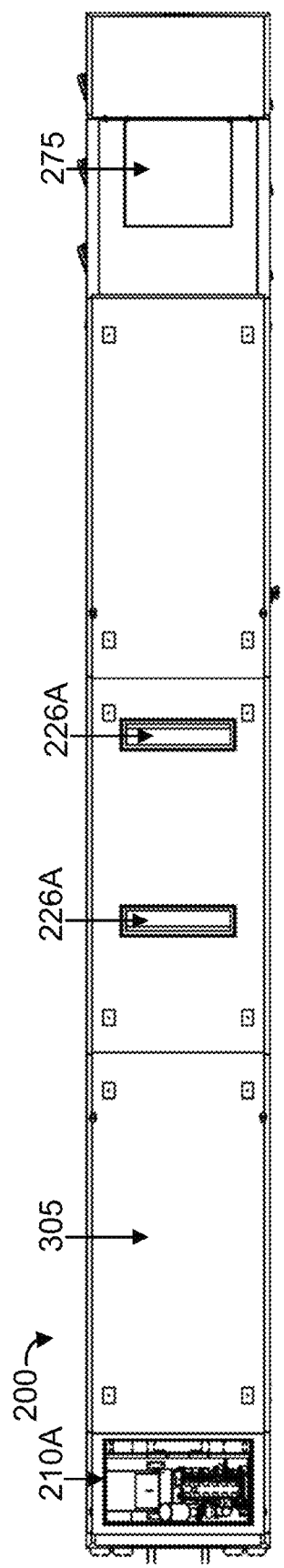
FIGS. 3A-3B are schematic diagrams showing top-profile views of a power generation transport, in accordance with one or more embodiments.
Figure 3B:
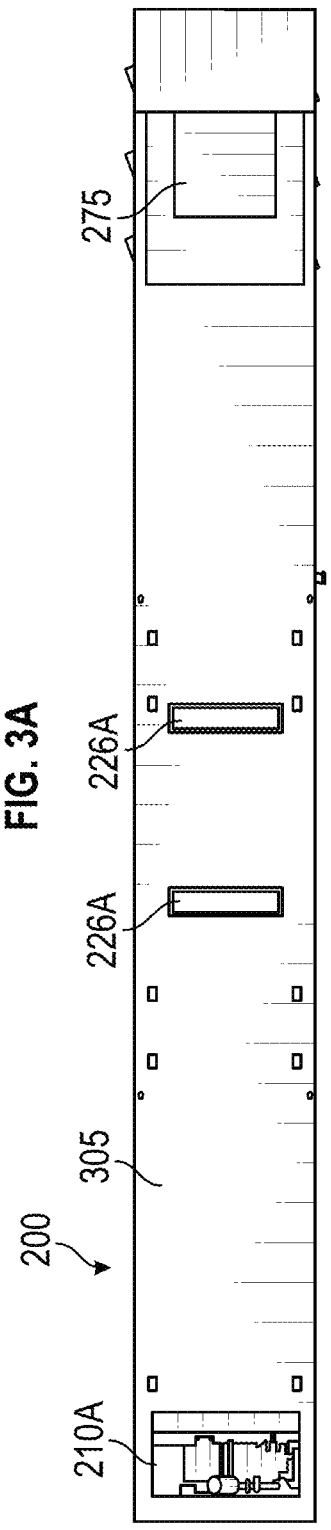
Figure 4:
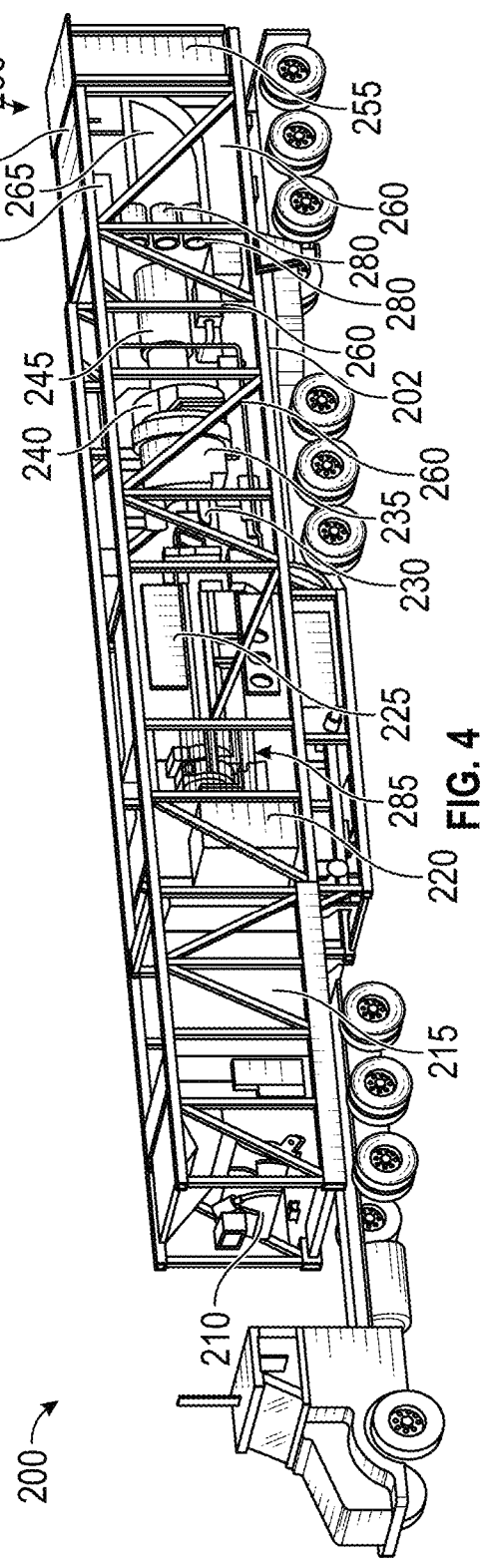
FIGS. 4 and 5 are schematic diagram showing perspective views of a power generation transport, in accordance with one or more embodiments.
Figure 5:
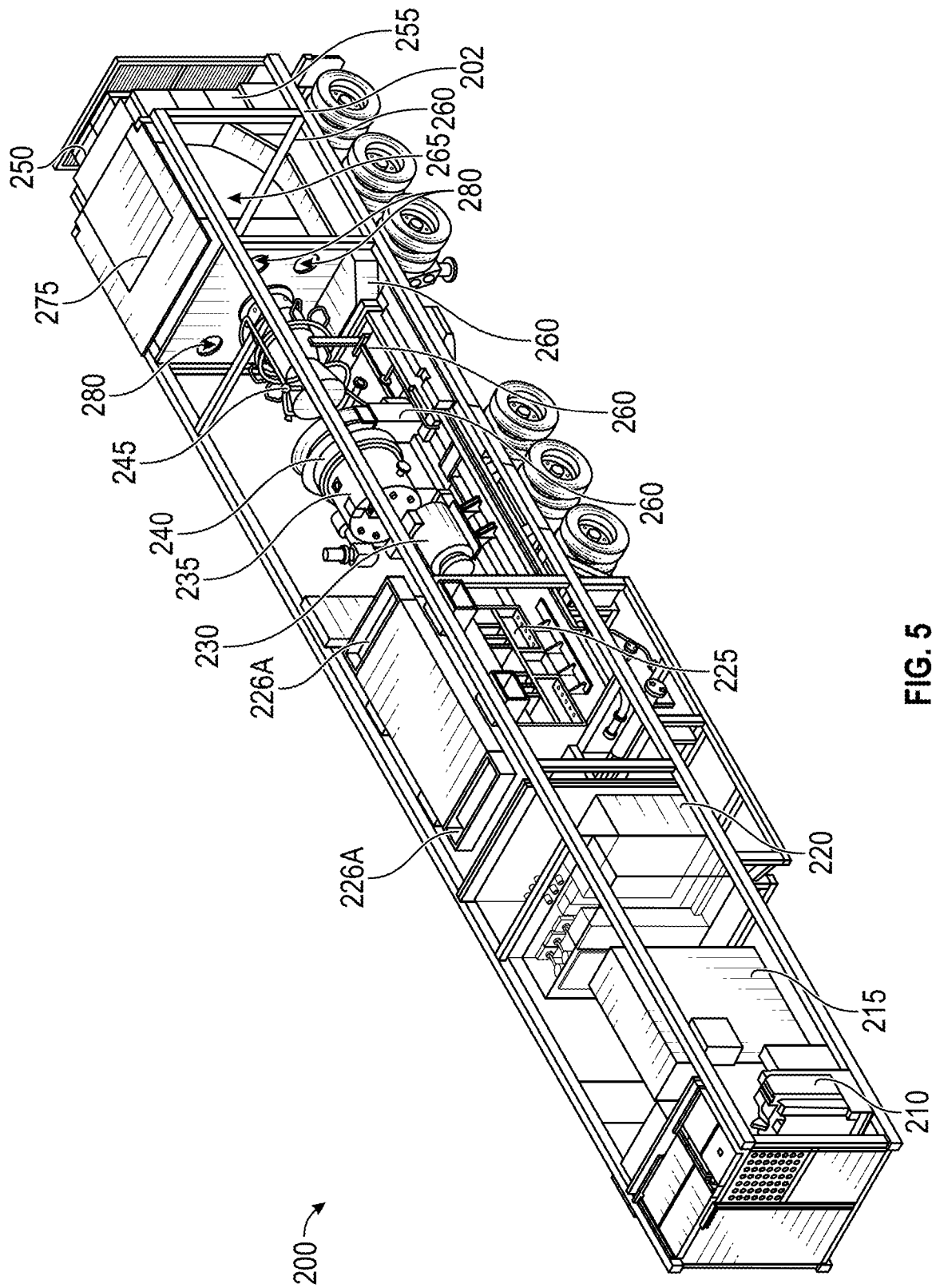

FIGS. 2A-2B are schematic diagrams showing a side-profile view of power generation transport 200 (e.g., gas turbine generator transport, mobile source of electricity 102, and the like), in accordance with one or more embodiments. FIGS. 3A-3B are schematic diagrams showing a top-profile view of power generation transport 200, in accordance with one or more embodiments. And FIGS. 4-5 are schematic diagrams showing different perspective views of power generation transport 200, in accordance with one or more embodiments. Note that components in common between FIGS. 2A-5 are denoted by the same reference numerals, and repetition of description thereof is omitted. In addition, to facilitate ease of description and explanation, not all components of power generation transport 200 are shown in each of FIGS. 2A-5. The different views and respective components of power generation transport 200 shown in each of FIGS. 2A-5 are to be considered as illustrative and not restrictive, and the intention is not to be limited to the details given herein. The different views shown in FIGS. 2A-5 illustrate power generation transport 200 with an enclosure thereof removed. That is, FIGS. 2A-5 depict components within the enclosure (not shown) of power generation transport 200.

Figure 6A:
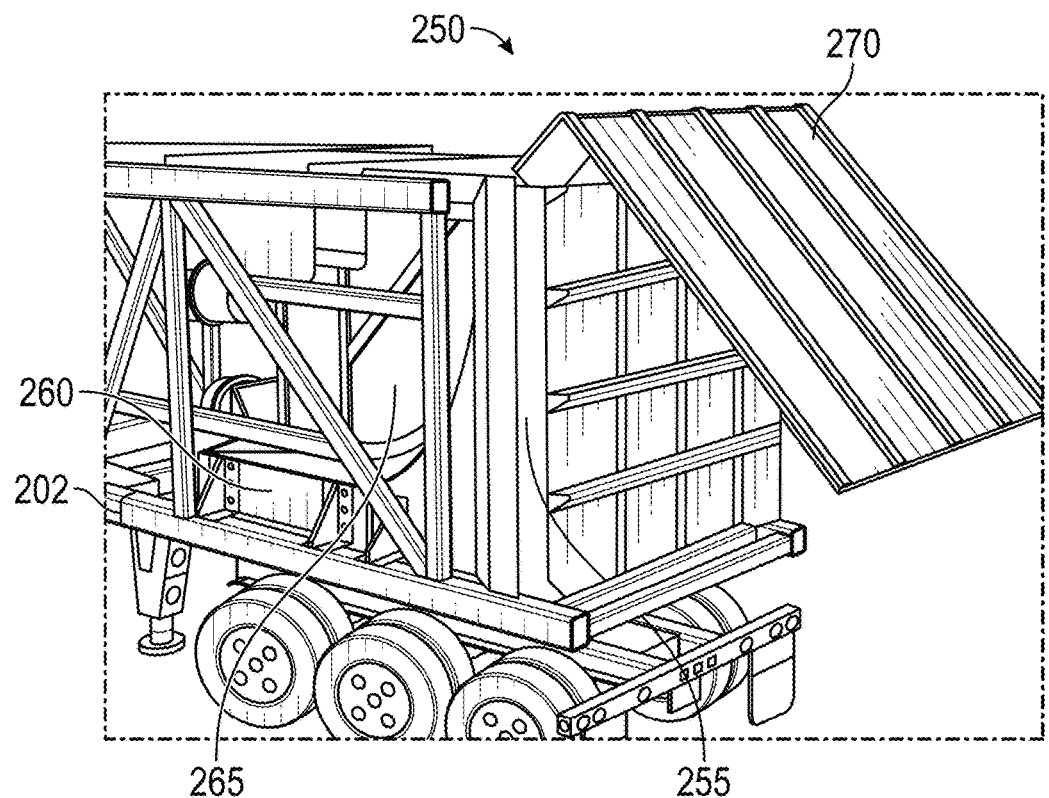
FIG. 6A is a schematic diagram showing a perspective view of an air intake and exhaust module disposed on a power generation transport in accordance with one or more embodiments, while the power generation transport is in an operational mode.
Figure 6B:
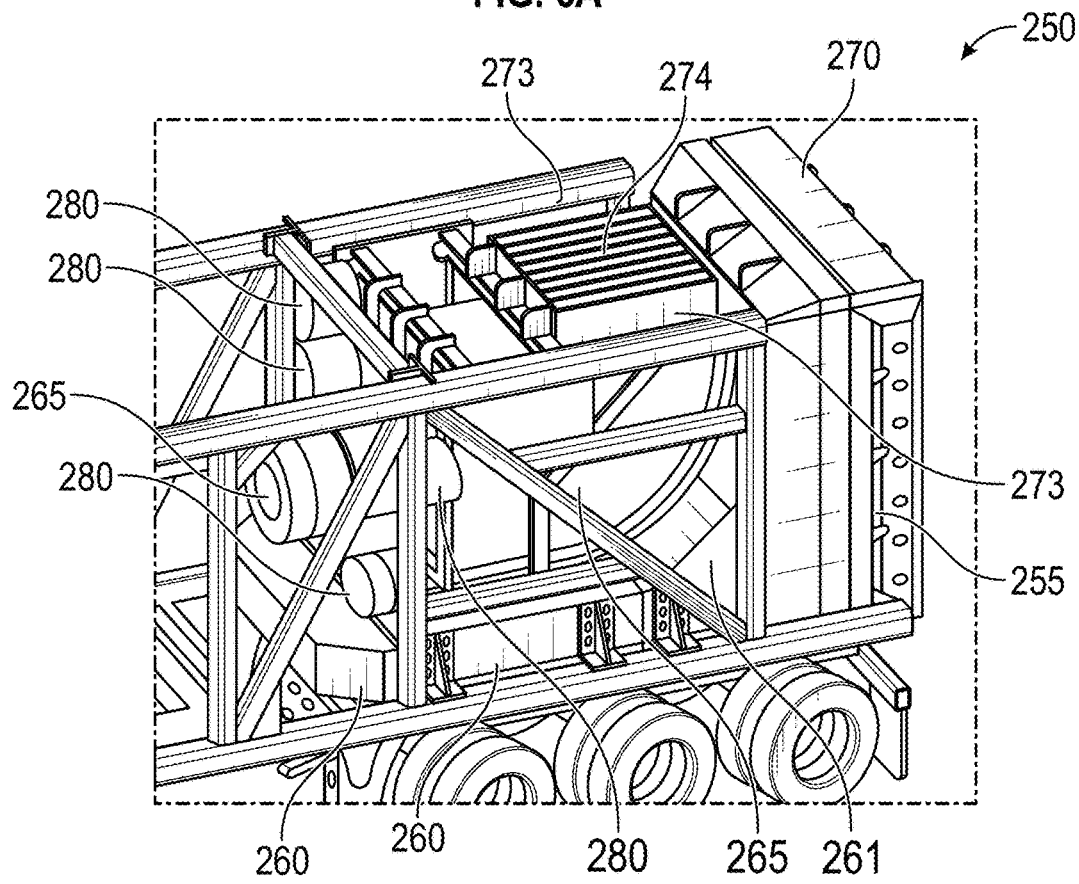
FIG. 6B is a schematic diagram showing a perspective view of an embodiment of an air intake and exhaust module disposed on a power generation transport in accordance with one or more embodiments, while the power generation transport is in a transportation mode.

As shown in one or more of FIGS. 2A-5, power generation transport 200 may comprise the following equipment or components: black start generator 210; control cabinets 215; switch gear (e.g., one or more transformers) 220; generator 225; starter electric motor 230; gearbox 235; inlet plenum 240; power source (e.g., gas turbine) 245; air intake and exhaust module 250; and air outlet cover (e.g., flap, hood, door and the like) 275. Air intake and exhaust module 250 may include air inlet filter housing 255, air inlet filter housing door (e.g., hood, cover, and the like) 270, intake air duct including one or more duct portions 260, exhaust collector 265, exhaust stack 266, and exhaust air outlet 274 (FIG. 6B). In addition, power generation transport 200 of FIGS. 2A-5 may be equipped with a ventilation and cooling system including one or more generator air outlets 226A (FIGS. 3A-3B); one or more ventilation and cooling air intake louvers 285 (FIGS. 2A, 2B, 4); one or more exhaust openings 280 (e.g., passages, channels, and the like); ventilation and cooling air fans and electric motors (not shown) disposed in exhaust openings 280; and one or more air outlets 273 (see FIG. 6B).

Other components not specifically labeled in FIGS. 2A-5, but which may also be located on power generation transport 200 include a gas conditioning system, a generator shaft, a generator breaker, a transformer, a control system, a controls room, a turbine lube oil system, a fire suppression system, a generator lube oil system, and the like. In one embodiment, power source 245 may be a gas turbine. In another embodiment, power source 245 may be another type of power source (e.g., internal combustion engine, diesel engine, and the like). Power source 245 is hereinafter referred to interchangeably as gas turbine 245. However, as stated above, power source 245 may correspond to other types of turbine or non-turbine-based power sources that are capable of generating sufficient mechanical energy for operating generator 225.

In one embodiment, gas turbine 245, gearbox 235, generator 225, and other components of power generation transport 200 shown in FIGS. 2A-5 may be supported on power generation transport 200 by being mounted on an engineered base frame 202, a sub-base, sub-skid, or any other sub-structure of power generation transport 200. The single engineered base frame 202 may be used to mount and to align the connections between gas turbine 245, gearbox 235, generator 225, inlet plenum 240, and one or more components of air intake and exhaust module 250 including air inlet filter housing 255, intake air duct 260 including one or more duct portions, and exhaust collector 265. In addition, base frame 202 may mount the various components thereon at a predetermined height from base 202 so as to create a clearance for intake air duct 260 of air intake and exhaust module 250 which may be disposed between gas turbine 245 and bed frame 202 and which may run along bed frame 202 from the exhaust side of gas turbine 245 to the intake end side thereof and be fluidly coupled to inlet plenum 240. Engineered base frame 202 may allow for easier alignment and connection of gas turbine 245, gearbox 235, and generator 225, air intake and exhaust module 250 and other components of power generation transport 200 compared to using a separate sub-base for gas turbine 245 and generator 225. Other embodiments of power generation transport 200 may use a plurality of sub-bases so as to, for example, mount gas turbine 245 and gearbox 235 on one sub-base and mount generator 225 on another sub-base.

As shown in one or more of FIGS. 2A-5, gas conditioning components (not shown), black start generator 210, control cabinet (e.g., control system or controls room) 215, switch gear 220, and starter electric motor 230 may also be disposed on power generation transport 200 (e.g., by being mounted on base frame 202). The gas conditioning components (e.g., gas conditioning unit or system) may be adapted to receive hydrocarbon gas (e.g., natural gas) from a hydrocarbon fuel source (e.g., a gas pipeline). The gas conditioning components may be disposed on power generation transport 200 or on a separate transport or trailer, sub-base, sub-skid, or any other sub-structure, and may be configured to provide hydrocarbon gas for operation of gas turbine 245. The gas conditioning components may include a gas conditioning system that regulates hydrocarbon gas pressures, heats the hydrocarbon gas, separates out liquids from the hydrocarbon gas (e.g., water), and/or filters out unwanted contaminants (e.g., sand) from the hydrocarbon gas. The gas conditioning components may also include a compression system that utilizes an electric motor to drive one or more compressors to compress the hydrocarbon gas to a designated pressure (e.g., about 300 pounds per square inch (PSI)). The gas conditioning components may subsequently output the processed hydrocarbon gas to a gas storage system that siphons a portion of the processed hydrocarbon gas to fill one or more gas storage tanks (not shown). Prior to storing the processed hydrocarbon gas within the gas storage tanks, the gas storage system may further compress the hydrocarbon gas to a relatively higher pressure level (e.g., about 3,000 PSI or 5,000 PSI). The remaining portion of the processed hydrocarbon gas bypasses any additional processing by the gas conditioning components and may be directly output to gas turbine 245 for electric power generation. When the pressure of the hydrocarbon gas received by the compression system of the gas conditioning components starts to drop below a predetermined backup pressure (e.g., about 500 PSI), the gas storage system of the conditioning skid may release the hydrocarbon gas stored within the gas storage tanks so as to output hydrocarbon gas that is free of contaminants to gas turbine 245 at a regulated and acceptable pressure level.

Black start generator 210 may be configured to provide power to control, ignite, or start gas turbine 245. In addition, black start generator 210 may provide ancillary power where peak electric power demand exceeds the electric power output of power generation transport 200. Black start generator 210 may comprise a diesel generator that may provide testing, standby, peaking, and/or other emergency backup power functionality for power generation transport 200 or other equipment powered by power generation transport 200. The Generator breaker (not labeled) may comprise one or more circuit breakers that are configured to protect generator 225 from current and/or voltage fault conditions. The generator breaker may be a medium voltage (MV) circuit breaker switchboard. In one embodiment, the generator breaker may include three panels, two for generator 225 and one for a feeder that protect relays on the circuit breaker. Other embodiments may include one or two or more than three panels for the generator breaker. In one embodiment, the generator breaker may be a vacuum circuit breaker.

Switch gear 220 may include a step-down transformer that is configured to lower generator 225 voltage to a lower voltage to provide control power to power generation transport 200. Gearbox 235 is provided to reduce the output rpm of turbine 245 to the operational rpm of generator 225. Starter motor 230 may be a motor (e.g., electric motor, hydraulic motor, air motor, and the like) coupled to gearbox 235 and/or gas turbine 245 to start operation of turbine 245. Control cabinet 215 may be a section of power generation transport 200 that houses all the electronics and controls of generator 225 and turbine 245. Control cabinet 215 may include a control system configured to control, monitor, regulate, and adjust power output of gas turbine 245 and generator 225. For example, in the embodiment where power generation transport 200 is implemented to provide a remote source of power, the control system may monitor and balance the load produced by the power consuming system or equipment, and generate electric power to match load demands. The control system may also be configured to synchronize and communicate with a control network system that allows a data van or other computing systems located in a remote location (e.g., off a well site) to control, monitor, regulate, and adjust power output of generator 225. Although FIGS. 2A-5 illustrate black start generator 210, control cabinet 215, switch gear 220, and starter electric motor 230 may be mounted on base frame 202 of power generation transport 200, other embodiments of power generation transport 200 may mount one or more of these components in other locations (e.g. on switch gear transport 112).

Other equipment that may also be located on power generation transport 200, but not specifically labeled or shown in FIGS. 2A-5 include the turbine lube oil system, gas fuel valves, generator lube oil system, gearbox lube oil system, and fire suppression system. The lube oil systems or consoles, which generally refer to both the turbine lube oil system, gearbox lube oil system, landing & leveling legs and associated hydraulics and generator lube oil system within this disclosure, may be configured to provide a generator lube oil filtering and cooling system and a turbine lube oil filtering and cooling system. In one embodiment, the turbine lube oil console area of the transport may also contain the fire suppression systems, which may comprise sprinklers, water mist, clean agent, foam sprinkler, carbon dioxide, and/or other equipment used to suppress a fire or provide fire protection for gas turbine 245. The mounting of the turbine, gearbox & generator lube oil consoles and the fire suppression system onto power generation transport 200 reduces this transport's footprint by eliminating the need for an auxiliary transport and connections for the turbine, gearbox and generator lube oil, filtering, cooling systems and the fire suppression systems to gas turbine generator transport 200. The turbine, gearbox, and generator lube oil systems may be mounted on a skid that is located underneath generator 225 or any other location on power generation transport 200.

Gas turbine 245 may be a General Electric (GE) turbine to generate mechanical energy (i.e., rotation of a shaft) from a hydrocarbon fuel source, such as natural gas, liquefied natural gas, condensate, and/or other liquid fuels. As generally shown in FIGS. 2A, 2B, 4, and 5, a shaft of gas turbine 245 is connected to gearbox 235 and generator 225 such that generator 225 converts the supplied mechanical energy from rotation of the shaft of gas turbine 245 to produce electric power. Gas turbine 245 may be a commercially available gas turbine such as a General Electric gas turbine, a Pratt and Whitney gas turbine, a Siemens gas turbine, a Baker Hughes gas turbine, or any other similar gas turbine. Generator 225 may be a commercially available generator such as a Brush generator, a WEG generator, or other similar generator configured to generate a compatible amount of electric power. For example, the combination of gas turbine 245, gearbox 235, and generator 225 disposed on power generation transport 200 may generate electric power from a range of at least about 1 megawatt (MW) to about 16 MW (e.g., 5.6 MW, 7.9 MW, and the like). Other types of gas turbine/generator combinations with power ranges greater than about 16 MW or less than about 1 MW may also be used depending on the application requirement.

As explained previously, air intake and exhaust module 250 may be modular and compact, and disposed on the rear end of transport 200. Air intake and exhaust module 250 may be configured so that it can be easily replaced by sliding a replacement components of air intake and exhaust module 250 at the rear end of transport 200. Air intake and exhaust module 250 may be integrally formed or may comprise a plurality of components that are coupled together at the rear end of transport 200. Air intake and exhaust module 250 may be configured to provide filtered air for combustion by gas turbine 245 and to safely vent hot exhaust air from turbine 245 via exhaust collector 265, exhaust stack 266, and air outlet 274. Further, the ventilation and cooling system disposed on power generation transport 200 may be configured to intake ambient air from the sides, and/or ends of the transport for ventilating an interior of an enclosure or compartment (not shown) of power generation transport 200, and for using the ambient fresh air to cool components (e.g., generator 225, gear box 235, gas turbine 245, exhaust collector 265, and exhaust stack 266) within the transport that may heat up during the power generation operation. Operation and configuration of air intake and exhaust module 250 and of the ventilation and cooling system of power generation transport 200 will be described in greater detail below in connection with FIGS. 2A-6B.

Figure 8A:
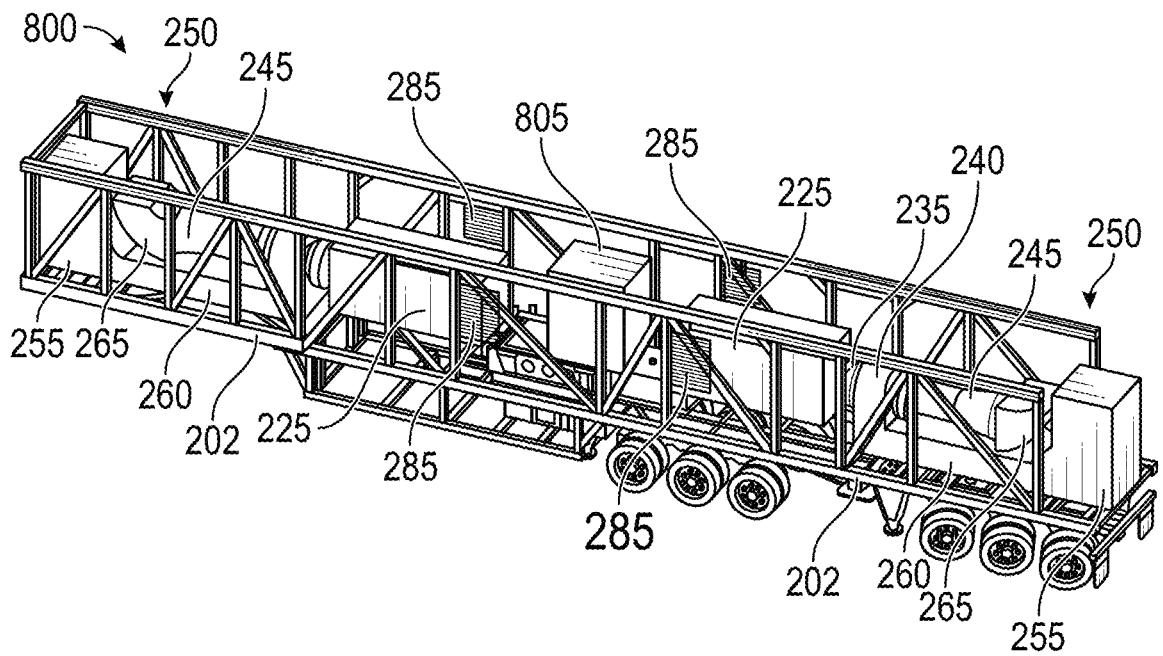
FIG. 8A is a schematic diagram showing a perspective view of another embodiment of a power generation transport.
Figure 8B:
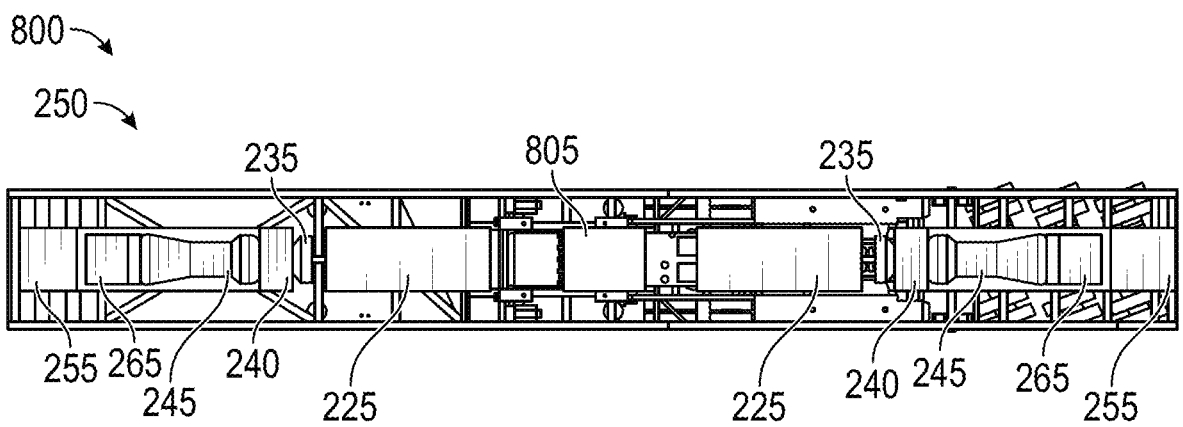
FIG. 8B is a schematic diagram showing a top-profile view of another embodiment of the power generation transport.

Although the embodiments shown in FIGS. 2A-6B depict a single train of components with the air intake and exhaust module 250 disposed at the rear end of the transport, this may not necessarily be the case. In an alternate embodiment, the arrangement of the components could be reversed so that air intake and exhaust module 250 is disposed at the front end of transport 200, followed by exhaust collector 265, turbine 245, gear box 235, and generator 225, in that order from the front end of transport 200. In yet another embodiment (shown in FIGS. 8A-8B), two independent trains of components may be disposed on the transport such that one air intake and exhaust module is disposed at the front end and a second air intake and exhaust module is disposed at the rear end. The embodiment shown in FIGS. 8A-8B is described in greater detail later.

FIGS. 2A-5 depict power generation transport 200 while power generation transport 200 is in a transportation mode. FIG. 6A is a schematic diagram showing a perspective view of an embodiment of air intake and exhaust module 250 disposed on power generation transport 200, while power generation transport 200 is in an operational mode. And FIG. 6B is a schematic diagram showing a perspective view of an embodiment of air intake and exhaust module 250 disposed on power generation transport 200, while power generation transport 200 is in a transportation mode. To fit within the limited physical dimensions available at the rear end of the transport, air intake and exhaust module 250 may be configured so that components for both the intake air flow passage (e.g., air inlet filter housing 255, intake air duct 260) and the exhaust air flow passage (e.g., exhaust collector 265) are disposed on the same side (e.g., rear side, exhaust side, and the like) of gas turbine 245. As explained previously, air intake and exhaust module 250 may include air inlet filter housing 255, air inlet filter housing door 270, intake air duct 260 (including one or more duct portions), exhaust collector 265, exhaust stack 266, and exhaust air outlet 274.

Gas turbine air inlet filter housing 255 may include one or more air inlets and one or more air filters that are mounted along an end side surface (e.g., rear end surface) and/or on longitudinal side surfaces of power generation transport 200 to intake ambient air from the end side of the transport for combustion by turbine 245. Combustion air may be air that is supplied to gas turbine 245 to aid in production of mechanical energy. As shown most clearly in FIG. 6A, air inlet filter housing 255 may include a plurality of air inlets and filters that are mounted as a two-dimensional grid or array of filters so as to extend substantially along a surface of the rear end side (e.g., a farthest aft end) of power generation transport 200. Although not shown in FIG. 6A, the plurality of air inlets and filters of air inlet filter housing 255 may also be mounted on one or both longitudinal side surfaces that are adjacent to the rear end surface of power generation transport 200. The arrangement of filter housing 255 or the number and arrangement of the gas turbine air inlets and filters of housing 255 is not intended to be limiting. Any number or arrangement of inlets and filters of filter housing 255 may be employed depending on, e.g., the amount or volume of clean air and the air flow dynamics needed to supply fresh combustion air to gas turbine 245 for the power generation operation, and the like.

As shown most clearly in FIGS. 6A and 6B, air inlet filter housing 255 may be covered with air inlet filter housing door 270 to cover the air inlets and filters from the elements when the power generation transport 200 is in the transportation mode (FIG. 6B). Door 270 may be coupled to a top end (or a side end) of housing 255 (or the frame of transport 200) by a coupling member (e.g., hinge) and may be controlled by an actuating system so as to be pivotable between a closed position during the transportation mode (FIG. 6B) and an open position during the operational mode (FIG. 6A). In some embodiments, door 270 may be pivotable between the closed and open positions manually. In case transport 200 is equipped with an actuating system, any suitable mechanism may be employed to mechanically actuate door 270 between the open and closed positions. For example, the actuating system may be implemented using a hydraulic system, an electric motor, a rack-and-pinion system, a pneumatic system, a pulley-based system, and the like. As shown in FIG. 6A, in the open position during the operational mode, the door 270 may remain open to allow ambient air to easily enter air inlet filter housing 255. During the operational mode, door 270 may also act as a roof that protects filters of air inlet filter housing 255 from environmental elements like sun, rain, snow, dust and the like. As shown in FIG. 6B, in the closed position during the transportation mode, door 270 may be controlled by the actuating system to be closed to prevent damage to the air inlet filter housing 255 during transportation, and provide increased aerodynamics and enhanced mobility of power generation transport 200 over a variety of roadways.

As shown in FIGS. 2A-6B, the plurality of air inlets of air inlet filter housing 255 may be fluidly coupled to intake air duct 260 (e.g., pipe, duct, passage, and the like). Intake air duct 260 may include one or more duct portions that are serially coupled to each other and that run along base frame 202 of transport 200 to extend from the rear end side of transport 200 toward the front end side. For example, as shown in FIG. 2B, an intake air duct portion disposed proximally to air intake filter housing 255 may include a tapered end 261 that is fluidly coupled via a flange portion to an output side of air inlet filter housing 255 to receive filtered air. The other end of the intake air duct portion may be fluidly coupled in series to one or more additional intake air duct portions (or to inlet plenum 240) so as to define an intake air flow passage (e.g., intake air flow path) for gas turbine 245. As shown most clearly in FIGS. 2A, 2B, and 5, the one or more duct portions defining intake air duct 260 of air intake and exhaust module 250 may extend along base frame 202 of power generation transport 200 so as to be disposed between base frame 202 on one side, and exhaust collector 265, gas turbine 245, and inlet plenum 240 on the other side. Inlet plenum 240 may be fluidly coupled to an intake port of gas turbine 245 via a flange connection. Inlet plenum 240 may be configured to collect the filtered intake air from gas turbine air inlet filter housing 255 via intake air duct 260 and supply the intake air to gas turbine 245.

A distal end of an intake air duct portion proximal to inlet plenum 240 may be fluidly coupled via a flange portion to inlet plenum 240 to provide the intake air filtered by air inlet filter housing 255 to gas turbine 245 for the power generation operation. Air inlet filter housing 255, intake air duct 260 (including one or more duct portions), and inlet plenum 240 may thus define a combustion intake air flow passage in which ambient air for combustion enters air inlet filter housing 255 from the rear end side of power generation transport 200 (exhaust end side of gas turbine 245), the ambient air is filtered by one or more filters of air inlet filter housing 255, and the filtered ambient air is channeled via tapered end 261 (see FIG. 6B) of an intake air duct portion of intake air duct 260 to flow from the exhaust end side of gas turbine 245 toward the intake end side thereof. In the intake air flow passage, the intake air channeled into intake air duct 260 flows underneath exhaust collector 265 and gas turbine 245 along base frame 202 to enter inlet plenum 240 on the intake end side of gas turbine 245. As shown most clearly in FIG. 2B, intake air duct 260 may be disposed so that a first (tapered) end 261 thereof is substantially perpendicular to air inlet filter housing 255, and a second (distal) end thereof is substantially perpendicular to inlet plenum 240. As shown in FIGS. 2A-2B and 4-6B, the intake air flow passage may thus include a first angular section defined by the flange coupling between air inlet filter housing 255 and the first end of intake air duct 260, and a second angular section defined by the flange coupling between inlet plenum 240 and the second end of intake air duct 260. Both the first end 261 and the second end of air duct 260 may be tapered.

The intake air flow passage may thus extend from air inlet filter housing 255 in a substantially downward sloping direction, and then in a first substantially horizontal direction underneath exhaust collector 265 and gas turbine 245 and along base frame 202 of transport 200. The intake air flow passage at the second angular section may then change a direction of flow of the intake air from the first substantially horizontal direction to a substantially vertical direction as the intake air enters inlet plenum 240. The inlet plenum 240 may further include a curved portion (e.g., shaped like an elbow joint) that changes a direction of flow of the intake air from the substantially vertical direction to a second substantially horizontal direction as the intake air enters into gas turbine 245 for combustion. As is evident from the figures, the second substantially horizontal direction of the intake air flow passage is opposite to the first substantially horizontal direction. Thus, the first substantially horizontal direction, the substantially vertical direction, and the second substantially horizontal direction of the intake air flow path define a substantially "U-shaped" intake air flow path. In some embodiments, the intake air flow passage may be configured for noise control and sound attenuation. For example, one or more of air inlet filter housing 255, one or more duct portions of intake air duct 260, and inlet plenum 240 may be equipped with one or more sound dampening silencers that reduce noise from power generation transport 200 during operation.

Air intake and exhaust module 250 may further include exhaust collector 265, exhaust stack 266, and air outlet 274 that collectively define an exhaust air flow passage (e.g., exhaust air flow path) in which exhaust air output from the exhaust port (e.g., exhaust end, exhaust, and the like) of gas turbine 245 is released out into the atmosphere from air outlet 274 disposed at the roof (e.g., ceiling or top side 305 in FIGS. 3A-3B) of the enclosure of power generation transport 200. As shown in FIGS. 2A-2B and 4, exhaust collector 265 (e.g., exhaust diffuser) may be aligned and coupled with the exhaust port of gas turbine 245 to collect exhaust air and supply the exhaust air to exhaust stack 266. Exhaust stack 266 may be vertically coupled so as to be stacked on top of exhaust collector 265 (i.e., exhaust stack 266 positioned on top of exhaust collector 265). Any suitable arrangement and coupling between exhaust collector 265 and exhaust stack 266 may be employed so that exhaust collector 265 and exhaust stack 266 may be housed within dimensions of power generation transport 200 (including underbelly truss or skid of transport 200). For example, as shown in FIGS. 2A-2B and 6B, exhaust collector 265 may include an upward curved portion 264 that is aligned and coupled with exhaust stack 266 positioned on top of the upward curved portion 264. Alternately, exhaust collector 265 and exhaust stack 266 may be integrally formed as a single component. The exhaust air flow passage defined by exhaust collector 265, exhaust stack 266, and air outlet 274 may thus extend from the exhaust port of gas turbine 245 and through a passage defined by exhaust collector 265. The exhaust end flow passage may then extend upward due to the upward curved portion 264 of exhaust collector 265 so as to change a direction of flow of the exhaust air from a substantially horizontal direction to a substantially vertical direction. The exhaust air flow passage may then extend substantially vertically through exhaust stack 266 and air outlet 274. As shown in FIG. 2A, an upper end of exhaust stack 266 may be flush with the roof or a top side of the enclosure of power generation transport 200. In some embodiments, gas turbine exhaust collector 265 and exhaust stack 266 may be configured for noise control and sound attenuation. For example, exhaust collector 265 and/or exhaust stack 266 may comprise a plurality of sound dampening silencers that reduce noise from power generation transport 200 during operation. The exhaust air flow passage may thus be configured to reduce exhaust noise and safely release (extremely hot) exhaust air into the atmosphere without posing danger to any equipment and/or an operator working in a vicinity of power generation transport 200.

As described above, both the intake air flow passage and the exhaust air flow passage of air intake and exhaust module 250 begin on the same side (e.g., rear side, exhaust end side, and the like) of gas turbine 245, with the intake air flow path passing underneath exhaust collector 265 and turbine 245 from the exhaust side to the intake side to be fed to inlet plenum 240 so as to define a substantially "U-shaped" intake air flow path. Air inlet filter housing 255 of air intake and exhaust module 250 may thus be provided on a side of gas turbine 245 that is opposite to the air intake port side.

As shown most clearly in FIGS. 3A-3B, 4 and 5, air outlet 274 of air intake and exhaust module 250 may be covered with air outlet cover 275 (e.g., flap, lid, and the like) to cover air outlet 274, and to protect exhaust collector 265, and exhaust stack 266 from environmental elements like rain, snow, dust and the like when the power generation transport 200 is in the transportation mode (FIG. 6B). Flap 275 may be disposed so as to be flush with the roof of the enclosure of power generation transport 200, and may be coupled to a frame of the roof of transport 200 by a coupling member (e.g., hinge) and may be controlled by an actuating system so as to be pivotable between a closed position during the transportation mode (FIGS. 3A-3B, 4 and 5) and an open position (not shown) during the operational mode. Any suitable mechanism may be employed to mechanically actuate cover 275 between the open and closed positions. For example, the actuating system may be implemented using a hydraulic system, an electric motor, a rack-and-pinion system, a pneumatic system, a pulley-based system, and the like. Alternately, cover 275 may be gravity biased (or spring-loaded) in the closed position and adapted to open during the operational mode due to the pressure of the exhaust expelled from exhaust collector 265 and exhaust stack 266. During the operational mode, cover 275 may remain in the open position to release exhaust air to the ambient environment. During the transportation mode, cover 275 may be controlled by the actuating system or other mechanism (e.g., manually) to be closed to provide increased aerodynamics and enhanced mobility of power generation transport 200 over a variety of roadways. Power generation transport 200 may be configured to be converted from the operational mode to transportation mode and vice-versa without attaching to an external transportation vehicle (e.g., a tractor or other type of motor vehicle, external mechanical means, external mechanical apparatus, and the like).

As explained previously, power generation transport 200 may further be equipped with the ventilation and cooling system configured to provide ventilation air to ventilate an interior of the enclosure or one or more compartments of power generation transport 200, and further provide cooling air to cool one or more components disposed on transport 200 that may heat up during the power generation operation. As shown in FIGS. 2A-6B, the ventilation and cooling system may include black start generator air outlet 210A (FIGS. 3A-3B); one or more generator air outlets 226A (FIGS. 3A-3B); one or more ventilation and cooling air inlets or louvers 285 (FIGS. 3A-4); one or more exhaust openings 280 (e.g., passages, channels, and the like; FIGS. 4-6B); ventilation and cooling air fans and motors (not shown) disposed in exhaust openings 280; and one or more air outlets 273 (FIG. 6B). The enclosure (not shown) of power generation transport 200 may include on top, side, or end surfaces thereof, cavities corresponding to black start generator air outlet 210A, generator air outlets 226A, ventilation and cooling air inlet louvers 285, one or more air outlets 273, and exhaust air outlet 274.

As shown in FIGS. 4-5 and 6B, one or more exhaust openings 280 may be provided on power generation transport 200 to exhaust ventilation and cooling air via air outlets 273 disposed on the roof of the enclosure of transport 200. In some embodiments, exhaust openings 280 may be defined so as to surround exhaust collector 265 and exhaust stack 266 on all sides thereof. That is, as shown most clearly in FIG. 5, a connection wall where the exhaust port of gas turbine 245 connects to the intake of exhaust collector 265, a plurality of exhaust openings 280 are disposed so as to surround the intake of exhaust collector 265. The plurality of exhaust openings 280 may be equipped with exhaust fans to draw in fresh air for ventilation and cooling of generator 225, gearbox 235, and gas turbine 245, and release the air out into the ambient atmosphere via air outlets 273 disposed so as to surround exhaust air outlet 274 at the roof of the enclosure. Exhaust openings 280 may define an annular space or compartment between an external peripheral surface of exhaust collector 265 and exhaust stack 266, and an internal peripheral surface of the enclosure of transport 200 and a (top-side) outer surface of intake air duct 260.

By operating the exhaust fans disposed in a ventilation and cooling air passage defined by exhaust openings 280, ambient air may be drawn into the enclosure of power generation transport 200 for ventilation and cooling. The ambient air may be drawn into the enclosure via ventilation and cooling air inlet louvers 285. Ventilation and cooling air inlet louvers 285 may be disposed on one or both of the longitudinal sides, and an end side of the enclosure of transport 200. The ambient air that is drawn in via the inlet louvers 285 and made to flow back around generator 225, gear box 235, and gas turbine 245 would ventilate and also cool the compartment of generator 225, gear box 235, and gas turbine 245 during operation. The drawn in fresh air coming in through both sides and/or an end face of the trailer may flow through the length of the enclosure, before it is released through exhaust openings 280, via the annular space or compartment disposed around exhaust collector 265 and exhaust stack 266, and out of the trailer through air outlets 273 at the ceiling. When not in operation, air outlets 273 may be covered with the same flap 275 that covers air outlet 274 for combustion air exhaust. The ventilation and cooling air passage may thus extend from inlet louvers 285, run along the length of the trailer where generator 225, gear box 235, and gas turbine 245 are disposed. The ventilation and cooling air passage may further extend along the annular space or compartment defined by the external peripheral surface of exhaust collector 265 and exhaust stack 266, and the internal peripheral surface of the enclosure of transport 200 and the top surface of air duct 260, and then exit the enclosure of transport 200 from air outlets 273 disposed surrounding exhaust air outlet 274 of the exhaust air flow passage at the roof of the enclosure.

Thus, as best shown in FIG. 6B, ventilation air flowing out via exhaust openings 280 and through the annular compartment or space along the external peripheral surface of exhaust collector 265 and exhaust stack 266 may come out on each side of exhaust collector 265 and exhaust stack 266 (e.g., underneath, on both sides, and/or on top of exhaust collector 265 when viewed in the longitudinal direction of transport 200) so that the filtered combustion air flowing in the intake air flow passage from tapered end 261 of intake air duct 260 toward inlet plenum 240 is not heated by the hot exhaust air flowing in the exhaust air flow passage from exhaust collector 265 and along upward curved portion 264 of exhaust collector 265 toward exhaust stack 266. In other words, ventilation air entering the enclosure via inlet louvers 285 may be circulated through the exhaust fans disposed in exhaust openings 280 to create an air insulation on all sides and all around (e.g., a periphery of) exhaust collector 265 and exhaust stack 266. The air insulation created by the ventilation and cooling air flowing through the ventilation and cooling air passage in the annular space or compartment may keep the external surface of the intake air flow passage (e.g., external top surface of intake air duct 260 and tapered end 261 facing exhaust collector 265) that carries filtered combustion air for combustion by gas turbine 245 from being heated. Thus, the ventilation and cooling system uses fresh ambient air to ventilate and cool radiated heat from generator 225, radiated heat from gear box 235, radiated heat from gas turbine 245, radiated heat from exhaust collector 265, and radiated heat from exhaust stack 266, and additionally protect the intake combustion air in the intake air flow passage from being heated by the exhaust air in the exhaust air flow passage.

To further cool generator 225 during operation, generator 225 may be equipped with air ventilation fans internal and/or external to generator 225 to draw air into a compartment of generator 225 via air inlet louvers 285, provide the drawn air to cool generator 225, and discharge air out on the top and/or sides via generator air outlets 226A. Other embodiments may have outlets 226A positioned on different locations of the enclosure for generator 225. In one embodiment, air inlet louvers 285 may be inlet louvres and outlets 210A, 226A, 273, and 274 may be outlet louvres that protect the interior of the enclosure from weather elements. A separate generator ventilation stack unit may be mounted on the top and/or side of power generation transport 200.

By adapting air intake and exhaust module 250 to be mounted on the same/single transport as the transport for inlet plenum 240, gas turbine 245, exhaust collector 265, and generator 225, power generation transport 200 provides a relatively quick rig-up and/or rig-down that eliminates the use of heavy lift cranes, forklifts, and/or any other external mechanical means or apparatus at the operational site. To improve mobility over a variety of roadways, power generation transport 200 in FIGS. 2A-6B may have a maximum height of about 13 feet and 6 inches, a maximum width of about 8 feet and 6 inches, and a maximum length of about 70 feet. Further, power generation transport 200 may comprise at least three axles used to support and distribute the weight on power generation transport 200. Other embodiments of power generation transport 200 may be transports that exceed three axles depending on the total transport weight. The dimensions and the number of axles may be adjusted to allow for transport over roadways that typically mandate certain height, length, and weight restrictions.

Figure 7:
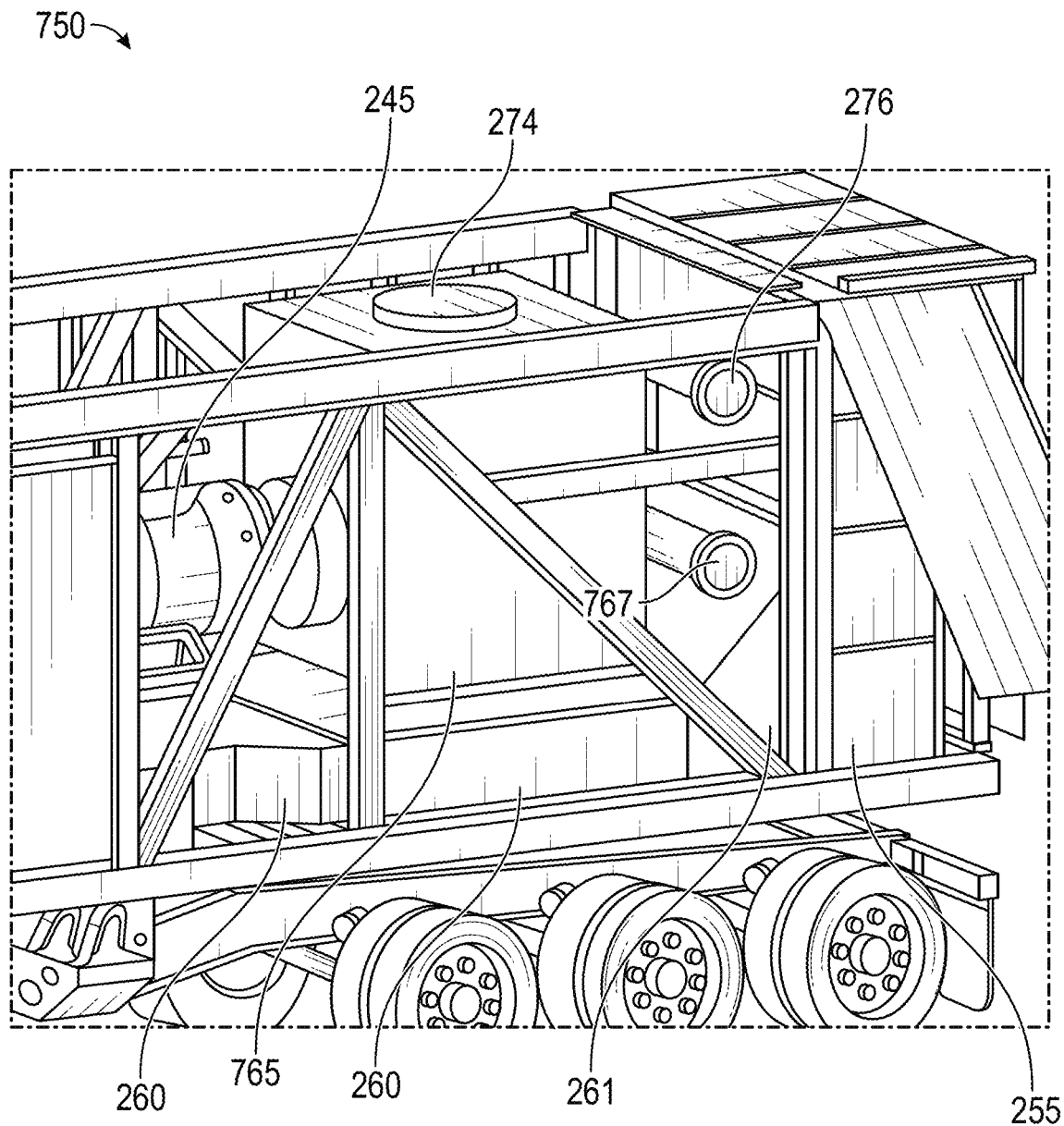
FIG. 7 is a schematic diagram showing a perspective view of another embodiment of an intake and exhaust module of a power generation transport equipped with a heat exchanger.

FIG. 7 is a schematic diagram showing a perspective view of an embodiment of intake and exhaust module 750 of power generation transport equipped with a heat exchanger. Components of the power generation transport shown in FIG. 7 that are the same as those of power generation transport 200 of FIGS. 2A-6B are labeled with the same reference numerals and detailed description thereof is omitted here. Components corresponding to the intake air flow passage of intake and exhaust module 750 of FIG. 7 are the same as components corresponding to the intake air flow passage of intake and exhaust module 250 of FIGS. 2A-6B. With respect to components corresponding to the exhaust air flow passage of intake and exhaust module 750 of FIG. 7, heat exchanger component 765 replaces one or both of exhaust collector 265 and exhaust stack 266 of the exhaust air flow passage of intake and exhaust module 250, or be provided in addition thereto. Similarly to the exhaust air flow passage of intake and exhaust module 250, exhaust air from gas turbine 245 may flow through the exhaust air flow passage of intake and exhaust module 750 to exhaust through air outlet 274 disposed at the roof of the enclosure of the power generation transport. However, the exhaust air flowing through the exhaust air flow passage of intake and exhaust module 750 may flow through heat exchanger component 765.

Heat exchanger component 765 may be configured to recover heat energy from the exhaust air of gas turbine 245 and utilize the recovered heat energy for predetermined applications or use cases. For example, heat exchanger component 765 could include heat exchanger coils that are disposed in the exhaust air flow passage defined by heat exchanger component 765 and that allow source fluid (e.g., water) to flow through the coils via input and output plumbing connections 766 and 767. As the source fluid flows within and through the heat exchanger coils, heat exchanger component 765 transfers thermal energy without transforming all of the source fluid into a gaseous state (e.g., steam). More specifically, exhaust air from gas turbine 245 provides thermal energy to one or more heat conducting elements, such as heat exchanger coils of heat exchanger component 765. At the same time, source fluid traverses through the heat conducting elements to heat the source fluid input through input plumbing connection 766 to a target temperature without transforming all of the source fluid into a gaseous state (e.g., steam). Afterwards, intake and exhaust module 750 may discharge the source fluid to one or more destinations via output plumbing connection 767. The heated source fluid may be used, for example, to heat and prevent icing of air inlet filter housing 255 when power generation transport 200 is being operated in cold environments.

In the embodiment shown in FIG. 7, heat exchanger component 765 replaces one or both of exhaust collector 265 and exhaust stack 266 of the exhaust air flow passage of intake and exhaust module 250. However, in an alternate embodiment, heat exchanger component 765 may be provided in addition to exhaust collector 265 and exhaust stack 266 of the exhaust air flow passage. In such an embodiment, heat exchanger component 765 may be placed on the roof of the enclosure of the power generation transport during the operational mode to recapture heat energy from the exhaust. For example, heat exchanger component 765 may be disposed on the roof of the enclosure so as to be coupled with exhaust air outlet 274 of intake and exhaust module 250 during operation.

FIG. 8A is a schematic diagram showing a perspective view of another embodiment of power generation transport 800. FIG. 8B is a schematic diagram showing a top-profile view of another embodiment of power generation transport 800. Components of power generation transport 800 shown in FIGS. 8A-8B that are the same as those of power generation transport 200 of FIGS. 2A-6B are labeled with the same reference numerals and detailed description thereof is omitted here. Power generation transport 200 shown in FIGS. 2A-6B illustrates a single train design in which a single turbine package is disposed on a single trailer. That is, FIGS. 2A-6B illustrate a single train design in which power generation transport 200 is equipped with a single gas turbine 245, a single generator 225, a single gear box 235, and a single air intake and exhaust module 250 that slides into the rear end of power generation transport 200. However, in an alternate embodiment shown in FIGS. 8A-8B, power generation transport 800 may have a dual independent train design in which two smaller turbine packages (e.g., GE gas turbines, Solar gas turbines, and the like) may be disposed on a single trailer. That is, in the alternate embodiment shown in FIGS. 8A-8B, power generation transport 800 may be equipped with two independent trains so that the single power generation transport 800 comprises two generators 225, two gear boxes 235, two gas turbines 245, and two instances of air intake and exhaust module 250 respectively disposed on both ends of the trailer. The two independent trains of power generation transport 800 may thus provide a power generation system with total redundancy.

That is, the two independent trains of transport 800 may be operated separately or collectively to generate electric power based on load demands. Further, the two independent trains of transport 800 may provide total redundancy so that if one of the two independent trains is out of operation for maintenance or repair, power generation transport 800 can still remain operational to generate mobile electric power using the other independent train disposed on the single trailer. Each of the two independent trains of power generation transport 800 may be equipped with components and may be operable in the same manner as the single train of power generation transport 200 of FIGS. 2A-6B. For example, each of the two trains may have a corresponding separate (or shared) ventilation and cooling system that draws in fresh air via corresponding louvers 285 for ventilation and cooling of the corresponding train of components (e.g., corresponding generator 225, corresponding gear box 235, corresponding gas turbine 245, and corresponding exhaust collector 265) and exhaust via corresponding air outlets on the ceiling of the trailer (not shown). Further, each of the two independent trains may have a corresponding intake air flow passage and exhaust air flow passage defined by the corresponding air intake and exhaust module 250 disposed at the corresponding (e.g., front and rear) end of transport 800.

Power generation transport 800 may further include control system 805 (e.g., control cabinet, control electronics, and the like) to control the dual independent trains with integrated controls on the single trailer package to run the two trains in parallel or independently. Control system 805 may enable power generation transport 800 to run the two trains fully independently or setup control so that the two trains can sync to each other and run in conjunction with one another so as to optimize overall performance metrics of transport 800 like emissions, efficiency, and the like. For example, control system 805 may be configured to independently ramp one of the two trains up or down during operation based on where the combined power of the two trains needs to be. Each train of power generation transport 800 may include its own control electronics including one or more synchronizers. Control system 805 may control the control electronics of the two trains by communicatively coupling with the synchronizers of the two trains so that the two trains can be synchronized to each other. Control system 805 may thus be configured (in hardware and/or software) to run the two trains fully independently or with a load distribution system to achieve load sharing or load balancing.

Figure 9:
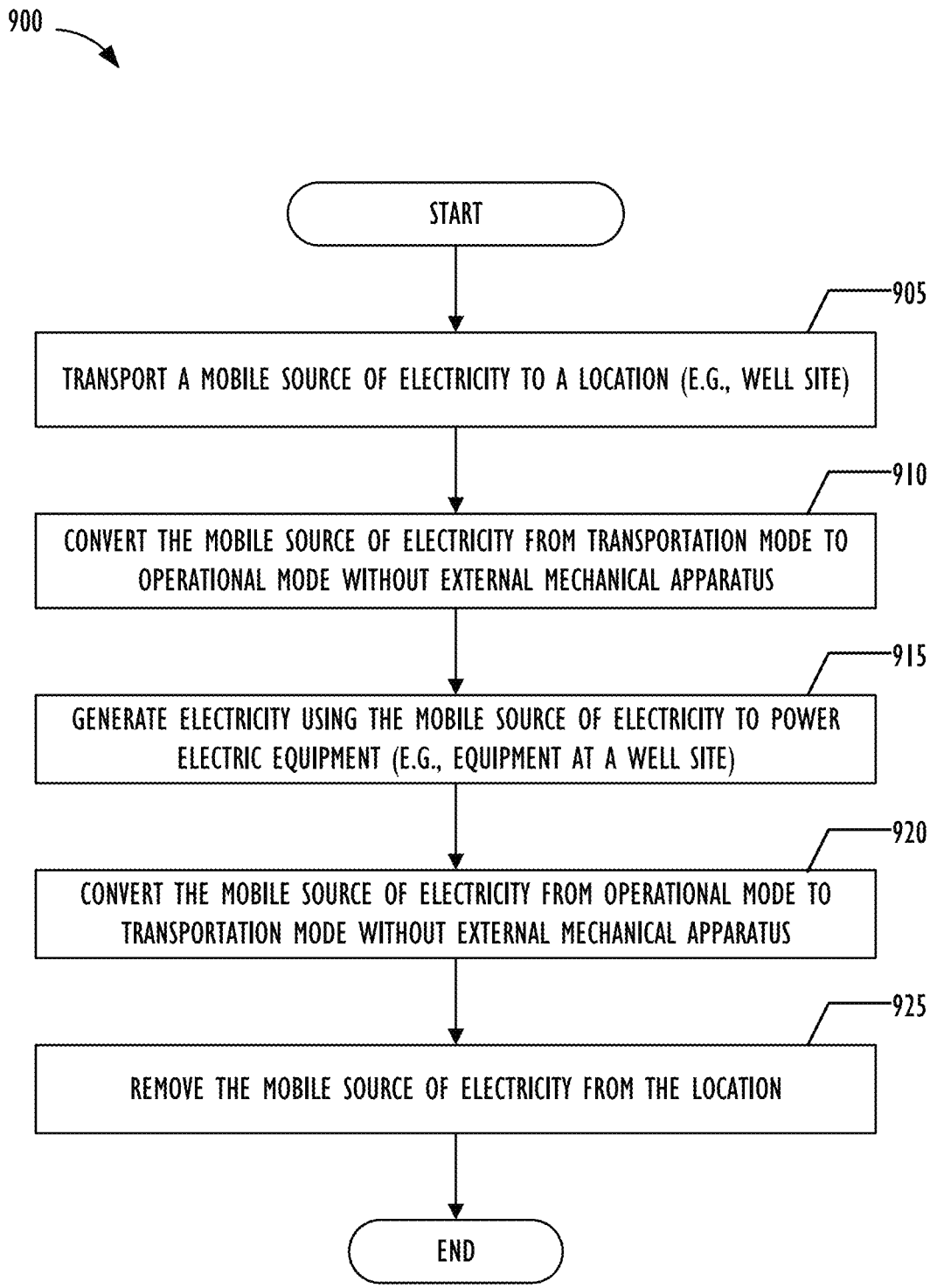
FIG. 9 is a flow chart of an embodiment of a method to provide a mobile source of electricity for various applications (e.g., hydraulic fracturing at a well site).

FIG. 9 is a flow chart of an embodiment of method 900 to provide a mobile source of electricity for any operation requiring a mobile power source. Method 900 may begin at block 905 by transporting a mobile source of electricity (e.g., power generation transport 200 or 800) to a remote location. Method 900 may then move to block 910 and convert the mobile source of electricity from transportation mode to operational mode. The same transport 200 or 800 may be used during the conversion from transportation mode to operational mode. In other words, transports are not added and/or removed when setting up the mobile source of electricity for operational mode. Additionally, method 900 may be performed without the use of a forklift, crane, and/or other external mechanical means to transition the mobile source of electricity into operational mode. For example, at block 910, power generation transport 200 or 800 may be converted from transportation mode to operational mode by setting door 270 and exhaust flap 275 to the open position (FIG. 6A) without requiring external mechanical apparatus, and supplying hydrocarbon fuel to gas turbine 245 for the power generation operation.

Method 900 may then move to block 915 and generate electricity using the mobile source of electricity to power a variety of operations requiring a mobile power source. In one embodiment, method 900 may generate electricity by converting hydrocarbon fuel into electricity using a gas turbine generator. Method 900 may then move to block 920 and convert the mobile source of electricity from operational mode to transportation mode without utilizing any external mechanical apparatus. Similar to block 910, the conversion process for block 920 may use the same transport without using a forklift, crane, and/or other external mechanical means to transition the mobile source of electricity back to transportation mode. For example, at block 920, power generation transport 200 or 800 may be converted from operational mode to transportation mode by setting door 270 and exhaust flap 275 to the closed position (FIGS. 5 and 6B) without requiring external mechanical apparatus. Method 900 may then move to block 925 to remove the mobile source of electricity from the location after mobile power is no longer needed.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A power generation transport comprising:
   a power source;
   a generator driven by the power source; and
   an air intake and exhaust module including:
     an air inlet filter housing;
     an intake air duct coupled to the air inlet filter housing at a first end and to an air intake of the power source at a second end; and
     an exhaust collector coupled to an air exhaust of the power source;

wherein the air intake and exhaust module is mounted at an end side of the power generation transport such that the air inlet filter housing and the exhaust collector are both disposed on an exhaust end side of the power source, wherein, in a longitudinal direction of the power generation transport, the exhaust collector disposed on the exhaust end side of the power source in between the air exhaust of the power source and the air inlet filter housing.

2. The power generation transport of claim 1, wherein the air intake and exhaust module is integrally formed as a modular unit and disposed at a rear end of the power generation transport.

3. The power generation transport of claim 1, further comprising an inlet plenum coupled to the air intake of the power source, wherein the second end of the intake air duct is coupled to the air intake of the power source via the inlet plenum.

4. The power generation transport of claim 1, wherein the exhaust collector has an upward curved portion and defines an exhaust air flow path for exhaust air expelled from the power source, and wherein the exhaust air flow path extends from the air exhaust of the power source, passes through a flow passage defined by the exhaust collector, extends upward at the upward curved portion of the exhaust collector, and ends at an exhaust air outlet disposed at a roof of the power generation transport.

5. The power generation transport of claim 4, wherein the exhaust air flow path is disposed between the air exhaust of the power source and the air inlet filter housing disposed at a rear end of the power generation transport.

6. The power generation transport of claim 5, further comprising a base frame that mounts and aligns the power source, the generator, and the air intake and exhaust module, wherein the intake air duct is disposed between the base frame and the power source, and between the base frame and the exhaust collector.

7. The power generation transport of claim 1, wherein the air inlet filter housing, the intake air duct, and the air intake of the power source define an intake air flow path for the power source, and wherein the intake air flow path extends underneath the power source and the exhaust collector along a length of the power source and the exhaust collector.

8. The power generation transport of claim 7, wherein the intake air flow path is substantially U-shaped at an intake end of the power source.

9. The power generation transport of claim 1, wherein the power source, the generator, and the air intake and exhaust module define a first power generation apparatus, wherein the end side of the power generation transport is a first end side where the air intake and exhaust module of the first power generation apparatus is mounted, and wherein the power generation transport further comprises a second power generation apparatus, the second power generation apparatus including:
a second power source;
a second generator driven by the second power source; and
a second air intake and exhaust module, wherein the second air intake and exhaust module is mounted at a second end side of the power generation transport that is opposite to the first end side.

10. The power generation transport of claim 1, wherein the intake air duct passes underneath the power source from the exhaust end side of the power source to an intake end side of the power source.

11. The power generation transport of claim 1, wherein the intake air duct passes underneath the exhaust collector such that the intake air duct is in between the exhaust collector and a base frame of the power generation transport.

12. The power generation transport of claim 1, wherein the exhaust collector exhausts combustion air exhaust from the power source and further exhausts ventilation and cooling air from a compartment of the power source.

13. The power generation transport of claim 12, wherein the exhaust collector includes a ventilation air outlet and an exhaust air outlet, the ventilation and cooling air from the compartment of the power source being discharged from the ventilation air outlet at a roof of the power generation transport, the ventilation air outlet surrounding the exhaust air outlet discharging the combustion air exhaust from the power source.

14. The power generation transport of claim 1, wherein the power source is a gas turbine.

15. The power generation transport of claim 1, wherein the generator is disposed on a side of the power source that is longitudinally opposite to a side of the power source where the air intake and exhaust module is disposed.

* * * * *